US010459773B2

(12) United States Patent
Okada et al.

(10) Patent No.: US 10,459,773 B2
(45) Date of Patent: Oct. 29, 2019

(54) PLD MANAGEMENT METHOD AND PLD MANAGEMENT SYSTEM

(71) Applicant: HITACHI, LTD., Tokyo (JP)

(72) Inventors: Mitsuhiro Okada, Tokyo (JP); Akifumi Suzuki, Tokyo (JP); Takayuki Suzuki, Tokyo (JP); Yuichiro Aoki, Tokyo (JP); Naoya Nishio, Tokyo (JP)

(73) Assignee: HITACHI, LTD., Tokyo (JP)

( * ) Notice: Subject to any disclaimer, the term of this patent is extended or adjusted under 35 U.S.C. 154(b) by 153 days.

(21) Appl. No.: 15/571,161

(22) PCT Filed: May 19, 2016

(86) PCT No.: PCT/JP2016/064809
§ 371 (c)(1),
(2) Date: Nov. 1, 2017

(87) PCT Pub. No.: WO2017/199383
PCT Pub. Date: Nov. 23, 2017

(65) Prior Publication Data
US 2018/0260257 A1    Sep. 13, 2018

(51) Int. Cl.
*G06F 9/46* (2006.01)
*G06F 9/52* (2006.01)
(Continued)

(52) U.S. Cl.
CPC .............. *G06F 9/524* (2013.01); *G06F 9/468* (2013.01); *G06F 9/5022* (2013.01); *G06F 9/526* (2013.01);
(Continued)

(58) Field of Classification Search
CPC ........ G06F 9/524; G06F 9/468; G06F 9/5022; G06F 9/52
See application file for complete search history.

(56) References Cited

U.S. PATENT DOCUMENTS 4,851,996 A * 7/1989 Boioli ................... G06F 13/14
710/242
4,977,494 A * 12/1990 Gabaldon .......... G05B 19/4141
318/568.2
(Continued)

FOREIGN PATENT DOCUMENTS

JP    05-150943 A    6/1993
JP    11-184718 A    7/1999
(Continued)

OTHER PUBLICATIONS

International Search Report, PCT/JP2016/064809, dated Jul. 19, 2017, 10 pgs.

*Primary Examiner* — Adam Lee
(74) *Attorney, Agent, or Firm* — Volpe and Koenig, P.C.

(57) ABSTRACT

The PLD management system includes a PLD management unit that manages the usage status of each of one or more PLDs. The PLD management unit receives a PLD usage request from a request source module which is one of a plurality of processing modules sharing each of the one or more PLDs. when the PLD management unit receives the usage request, the PLD management unit performs control to prevent two or more processing modules including the request source module from utilizing the same PLD at the same time based on a current usage status of a PLD corresponding to the usage request and content of the usage request.

20 Claims, 18 Drawing Sheets

(51) Int. Cl.
*G06F 9/50* (2006.01)
*G06F 15/78* (2006.01)

(52) U.S. Cl.
CPC ...... *G06F 15/7867* (2013.01); *G06F 15/7871* (2013.01)

(56) References Cited

U.S. PATENT DOCUMENTS

| | | | | |
|---|---|---|---|---|
| 6,049,487 | A * | 4/2000 | Plants | G11C 8/16 365/189.04 |
| 6,088,795 | A * | 7/2000 | Vorbach | G06F 15/7867 712/15 |
| 6,721,872 | B1 * | 4/2004 | Dunlop | G06F 13/387 709/221 |
| 6,828,822 | B1 * | 12/2004 | Bellis | G06F 13/1605 326/38 |
| 6,856,171 | B1 * | 2/2005 | Zhang | H03K 5/135 326/46 |
| 6,888,372 | B1 * | 5/2005 | Hazanchuk | G06F 7/523 326/38 |
| 6,915,518 | B1 * | 7/2005 | Jacobson | G06F 9/505 710/104 |
| 7,032,029 | B1 * | 4/2006 | Tanzman | G05B 9/03 700/82 |
| 7,096,324 | B1 * | 8/2006 | May | G06F 17/5045 710/200 |
| 7,272,677 | B1 * | 9/2007 | Venkata | G06F 1/12 710/1 |
| 7,356,554 | B1 * | 4/2008 | Hazanchuk | G06F 7/5324 326/39 |
| 7,380,039 | B2 * | 5/2008 | Miloushev | G06F 9/5016 710/244 |
| 7,836,448 | B1 * | 11/2010 | Farizon | G06F 9/4843 709/225 |
| 8,234,647 | B1 * | 7/2012 | Chutinan | G06F 11/3608 718/102 |
| 8,270,671 | B1 * | 9/2012 | Medasani | G06K 9/00986 382/103 |
| 8,519,739 | B1 * | 8/2013 | Leon | G06F 15/7867 326/38 |
| 2002/0116664 | A1 * | 8/2002 | Tu | G06F 9/52 714/31 |
| 2002/0124042 | A1 * | 9/2002 | Melamed | G01M 15/00 718/102 |
| 2002/0131765 | A1 * | 9/2002 | DeKeyser | H04N 5/9261 386/327 |
| 2003/0122577 | A1 * | 7/2003 | Veenstra | G06F 17/5054 326/38 |
| 2005/0246707 | A1 * | 11/2005 | Ismail | G06F 9/5011 718/100 |
| 2006/0031595 | A1 * | 2/2006 | Vorbach | G06F 15/7867 710/8 |
| 2006/0038586 | A1 * | 2/2006 | Xia | G06F 17/5054 326/39 |
| 2006/0085793 | A1 * | 4/2006 | McKenney | G06F 9/526 718/100 |
| 2006/0156308 | A1 * | 7/2006 | Jarvis | G06F 9/524 718/104 |
| 2007/0088886 | A1 * | 4/2007 | Conner | G06F 13/1663 710/244 |
| 2008/0024165 | A1 * | 1/2008 | Madurawe | H03K 19/17736 326/41 |
| 2008/0148087 | A1 * | 6/2008 | Kim | G06F 1/14 713/502 |
| 2009/0192639 | A1 * | 7/2009 | Cellier | G06F 9/52 700/94 |
| 2009/0240917 | A1 * | 9/2009 | Fitton | G06F 17/16 712/36 |
| 2009/0271789 | A1 * | 10/2009 | Babich | G06F 9/526 718/100 |
| 2010/0005272 | A1 * | 1/2010 | Vuletic | G06F 9/3877 711/213 |
| 2010/0186013 | A1 * | 7/2010 | Harrop | G06F 9/524 718/100 |
| 2010/0244896 | A1 * | 9/2010 | Murotake | G06F 9/4401 326/41 |
| 2011/0029981 | A1 * | 2/2011 | Jaisinghani | H04L 41/12 718/104 |
| 2011/0047549 | A1 * | 2/2011 | Rogers | G06F 9/50 718/100 |
| 2011/0126173 | A1 * | 5/2011 | Tzoref | G06F 11/3688 717/126 |
| 2012/0005684 | A1 * | 1/2012 | Ziarek | G06F 9/528 718/103 |
| 2013/0055284 | A1 * | 2/2013 | Sabato | G06F 9/526 718/106 |
| 2013/0174165 | A1 * | 7/2013 | Chopra | G06F 11/1482 718/102 |
| 2013/0247060 | A1 * | 9/2013 | Makljenovic | G06F 9/526 718/104 |
| 2013/0326509 | A1 * | 12/2013 | Tsirkin | G06F 9/5077 718/1 |
| 2014/0026111 | A1 * | 1/2014 | Stitt | G06F 9/4484 717/101 |
| 2014/0282593 | A1 | 9/2014 | Lippett | |
| 2015/0058828 | A1 * | 2/2015 | Narutani | G06F 11/3664 717/135 |
| 2015/0091613 | A1 * | 4/2015 | Tahiri | H03K 19/017581 326/38 |
| 2015/0091614 | A1 * | 4/2015 | Tahiri | H03K 19/17704 326/38 |
| 2015/0143316 | A1 * | 5/2015 | Hosny | G06F 17/5072 716/113 |
| 2015/0220372 | A1 * | 8/2015 | Ban | G06F 9/52 710/200 |
| 2015/0303926 | A1 * | 10/2015 | Tahiri | H03K 19/17752 326/40 |
| 2016/0098303 | A1 * | 4/2016 | Balakrishnan | G06F 9/5016 718/102 |
| 2016/0103779 | A1 * | 4/2016 | Singh | G06F 13/4282 710/117 |
| 2016/0274943 | A1 * | 9/2016 | Hom | G06F 16/2358 |

FOREIGN PATENT DOCUMENTS

| | | |
|---|---|---|
| JP | 2013-065172 A | 4/2013 |
| JP | 2013-239199 A | 11/2013 |

\* cited by examiner

PLD MANAGEMENT METHOD AND PLD MANAGEMENT SYSTEM

TECHNICAL FIELD

The present invention relates generally to a method and system for managing a Programmable Logic Device (PLD).

BACKGROUND ART

In recent years, the rate of CPU performance improvement has slowed, and research of computing apparatuses capable of performing high speed calculations using a Field Programmable Gate Array (FPGA) as well as a CPU, prompting increases. Herein, an FPGA is one example of a PLD.

As an usage method of the FPGA, it is common to load FPGA configuration data in the FPGA at the time of device power-on, and use it as dedicated hardware. In this method, as FPGA configuration data is loaded only at the time of device power-on, when it is desirable to share the FPGA between multiple applications, it is necessary to load the FPGA configuration data corresponding to the functions of all the applications that will be used. In a single application, however, only a portion of the application's functionality can be utilized, and there is no guarantee that all the applications will be used, such that the FPGA cannot be used efficiently.

PTL 1 discloses a technique in which "an FPGA board (programmable logic circuit) is provided on the bus line of a CPU, circuit data to be written to the FPGA board together with the application program is loaded from an external storage apparatus such as a floppy disk apparatus, and the circuit data is written to the FPGA board such that the FPGA board can be used as a dedicated logic circuit in the application."

CITATION LIST

Patent Literature

[PTL 1] Japanese Patent Laid-Open No. H5-150943

SUMMARY OF INVENTION

Technical Problem

By performing the operation disclosed in PTL 1, it is possible to load optimal FPGA configuration data for each application.

However, when multiple applications are running simultaneously, or when a single application receives multiple instructions and performs them in parallel, it is not possible to obtain the correct results when simultaneously using the same FPGA. PTL 1 does not disclose a method for avoiding such a problem. Further, PTL 1 also does not disclose a method of efficiently sharing the same FPGA.

The same or similar problems can also occur when a Programmable Logic Devices (PLD) other than an FPGA is used.

Solution to Problem

The PLD management system includes a PLD management unit that manages the usage status of each of one or more PLDs. The PLD management unit receives a PLD usage request from a request source module which is one of a plurality of processing modules sharing each of the one or more PLDs. In case of receiving the PLD usage request, the PLD management unit performs control to prevent two or more processing modules including the request source module from utilizing the same PLD at the same time based on a current usage status of a PLD corresponding to the PLD usage request and the content of the usage request.

Advantageous Effects of Invention

According to the present invention, it is possible to avoid cases in which a plurality of processing modules use the same PLD at the same time, as well as facilitate efficient utilization of the same PLD. Furthermore, even in situations when a plurality of PLDs are present, it is possible to conceal the fact that a plurality of PLDs are present from a plurality of processing modules using the PLD management unit. Accordingly, designs (for example, programs designs or apparatus designs) that are unaware of the presence of a plurality of processing modules may be achieved.

DESCRIPTION OF EMBODIMENTS

Hereinafter, embodiments of the present invention will be described with reference to the Figures. It should be noted that the embodiments described herein do not limit the invention according to the claims, and it should be understood that all the elements and combinations thereof described herein are not necessary for implementation of the present invention.

In addition, in the following description, there are cases where a "program" (for example, application) is used as a subject of the explanation, but in actuality the program is executed by a processor so that a predetermined processing operation may be carried out. However, in order to prevent the description from becoming redundant, the program may be a subject of the explanation. In addition, part or all of the program may be realized using dedicated hardware. The storage device, may, for example, include an Integrated Circuit (IC) card, a Secure Digital (SD) card, a Digital Versatile Disk (DVD), or other storage apparatus.

Further, although the present invention is applicable to PLD in general, FPGA is adopted as an example of PLD according to the present embodiment.

In addition, in the following description, reference symbols are used when describing elements of the same type without distinction, and element identification symbols are used in place of reference symbols to distinctly describe individual elements of the same type. For example, when referring to an application generally without distinction, it may be described as "application 101," and when describing individual applications distinctly, they may be referred to as "application #1" and "application #2."

First Embodiment

Figure 1:
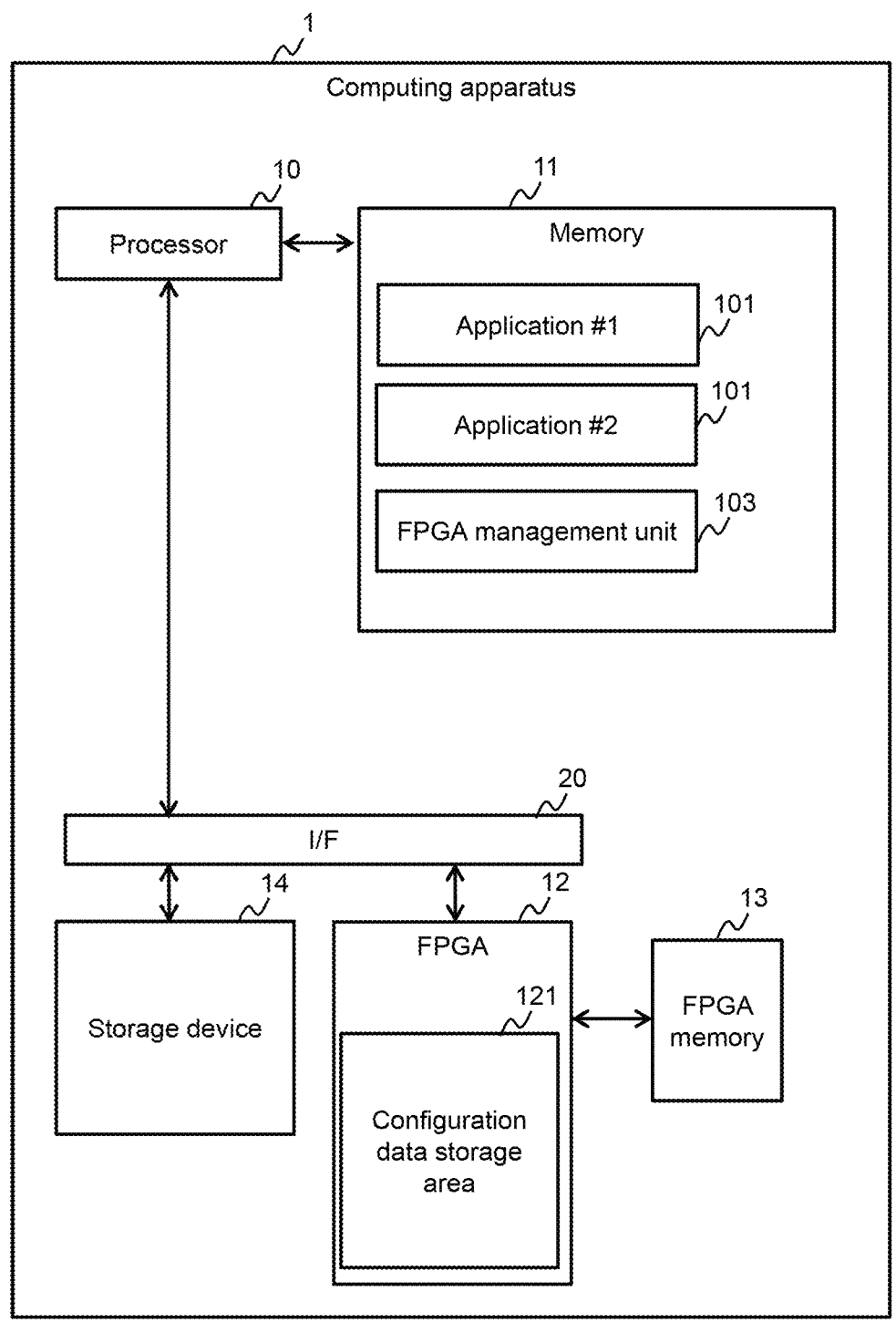
FIG. 1 illustrates a configuration of a computing apparatus according to a first embodiment.

FIG. 1 illustrates a configuration of a computing apparatus according to a first embodiment.

The computing apparatus 1 includes a processor 10, a memory 11, an FPGA 12, an FPGA memory 13, a storage device 14, and an I/F (interface) 20. The processor 10 executes a program utilized by a user for business or the like. Although only one processor is illustrated in FIG. 1, a plurality of processors 10 may exist in the computing apparatus 1. Further the processor 10 may be a multi-core processor. The present embodiment will be described with respect to an example configuration using a 4-core multi-core processor.

The memory 11 is utilized as a main storage of the processor 10. When the processor 10 executes a program, the program and the data are loaded into the memory 11, and the processor 10 reads the program from the memory 11 and executes it. In the memory 11, for example, a plurality of applications and an FPGA management unit 103 are stored as programs. As shown in FIG. 1, two applications including an application #1 (101) and an application #2 (102) are representatively illustrated as an example of the plurality of applications. These programs are executed by the processor 10.

The FPGA 12 is an example of a Programmable Logic Device (PLD), and is hardware capable of rewriting functions. By loading the FPGA configuration data into a configuration data storage area 121 in the FPGA 12, it is possible to flexibly modify the operation within the FPGA 12. As such, it is possible to upgrade the functions without changing the apparatus configuration. The FPGA memory 13 is a dedicated memory (for example, Dynamic Random Access Memory (DRAM)) that can be accessed only by the FPGA 12. Although FIG. 1 illustrates a memory that can be exclusively accessed by the FPGA 12, it is not necessary that the memory be dedicated memory exclusively accessible by the FPGA 12, such that the memory 11 is shared and used.

The storage device 14 is a nonvolatile storage device for storing write data from the processor 10, and for example, a Solid State Drive (SSD) or a Hard Disk Drive (HDD) is used as it.

The I/F 20 is a component for transferring data between the processor 10 and peripheral devices (network devices and the like not shown, are one type of the peripheral device). In the present embodiment, communication between the processor 10 and the FPGA 12, as well as between the processor 10 and the storage device 14, is performed according to the PCI-Express (hereinafter referred to as "PCIe") standard. However, the I/F 20 is not limited to PCIe, but may be another standard for transfer between devices or an original I/F.

Figure 2:
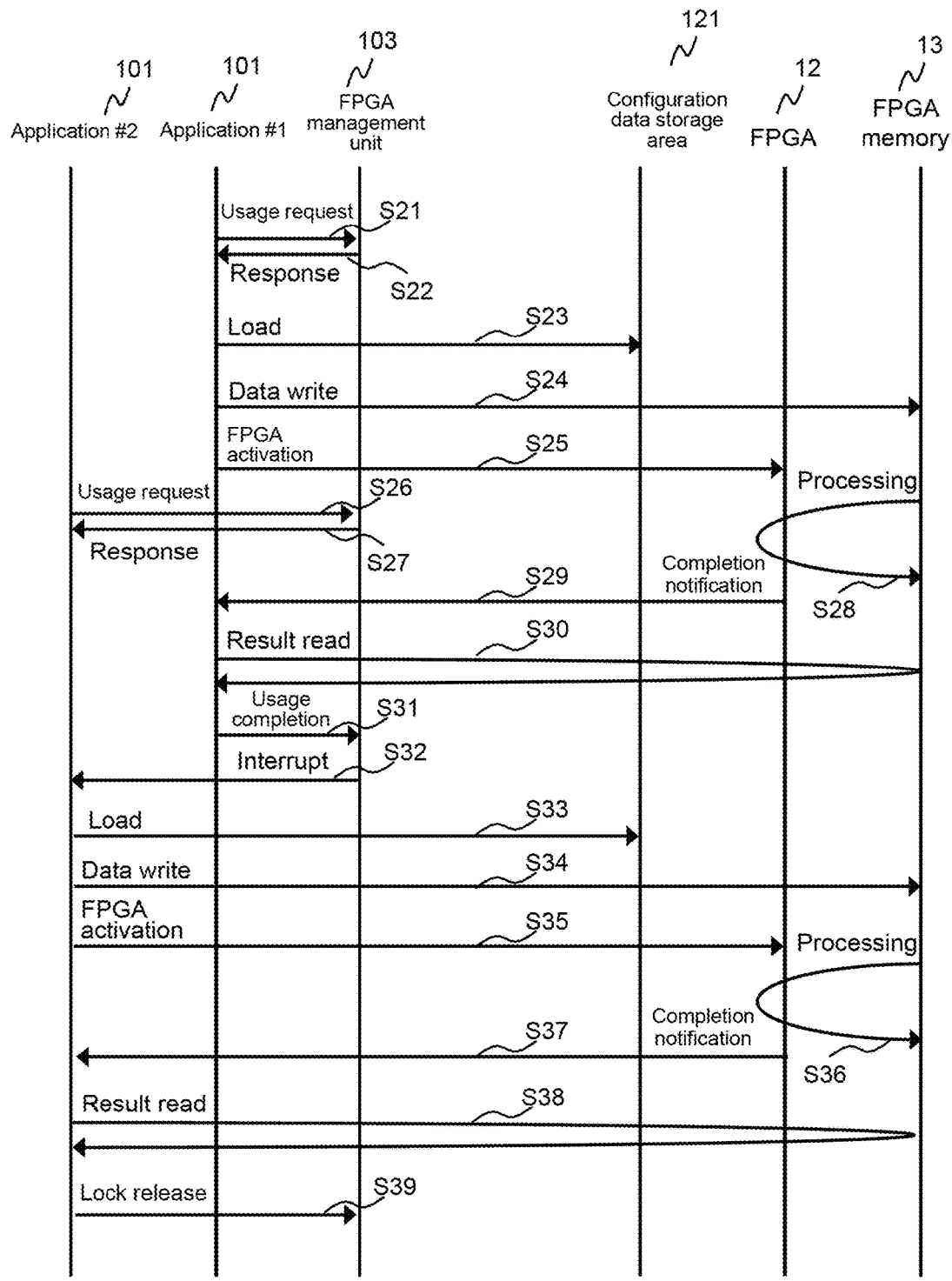
FIG. 2 illustrates an example of an operation flow when applications #1 and #2 operate simultaneously with respect to the first embodiment.

FIG. 2 illustrates an example of an operation flow when two different applications including applications #1 and #2 both utilize the FPGA 12, operate simultaneously.

Figure 3:
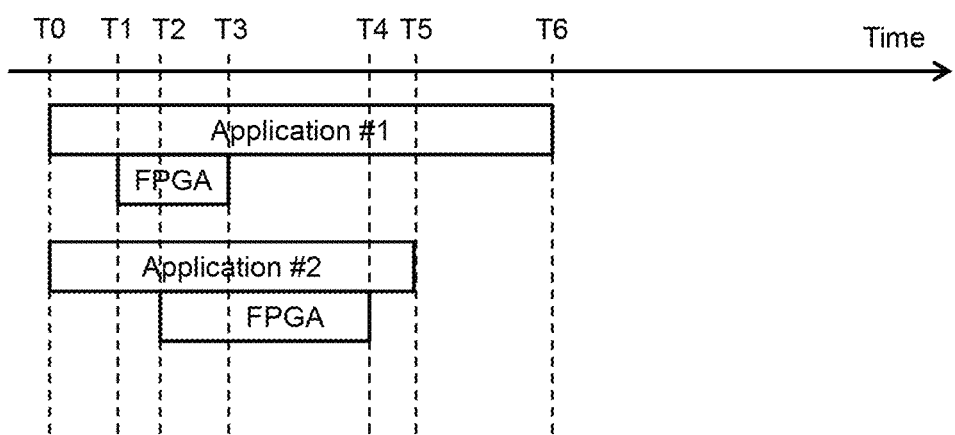
FIG. 3 illustrates an example of an operation time when each of the applications #1 and #2 is operated as a single unit.

The vertical axis represents each component of the computing apparatus 1. As described above, the application #1, the application #2, and the FPGA management unit 103 are programs executed by the processor 10. Both the application #1 and the application #2 are programs that utilize the FPGA 12, and FIG. 3 illustrates an example of an operation time when each of the applications #1 and #2 is operated as a single unit. For the sake of comparison of the behavior of each application, it is assumed that both applications start at time T0 and operation times are listed side-by-side. The "FPGA" box depicted under each application indicates the time during which the FPGA 12 is in use. According to FIG. 3, the application #1 uses the FPGA 12 in the time range from time T1 to time T3, and the end time is T6. In contrast, the application #2 uses the FPGA 12 in the time range from time T2 to time T4, and the end time is T5. Also, besides the FPGA 12, these indicate processes by the processor 10. During the time that the FPGA 12 is performing processing, each application may wait for completion of the processing being performed by the FPGA 12 until the processing is completed, or may perform other processes in parallel.

Figure 4:
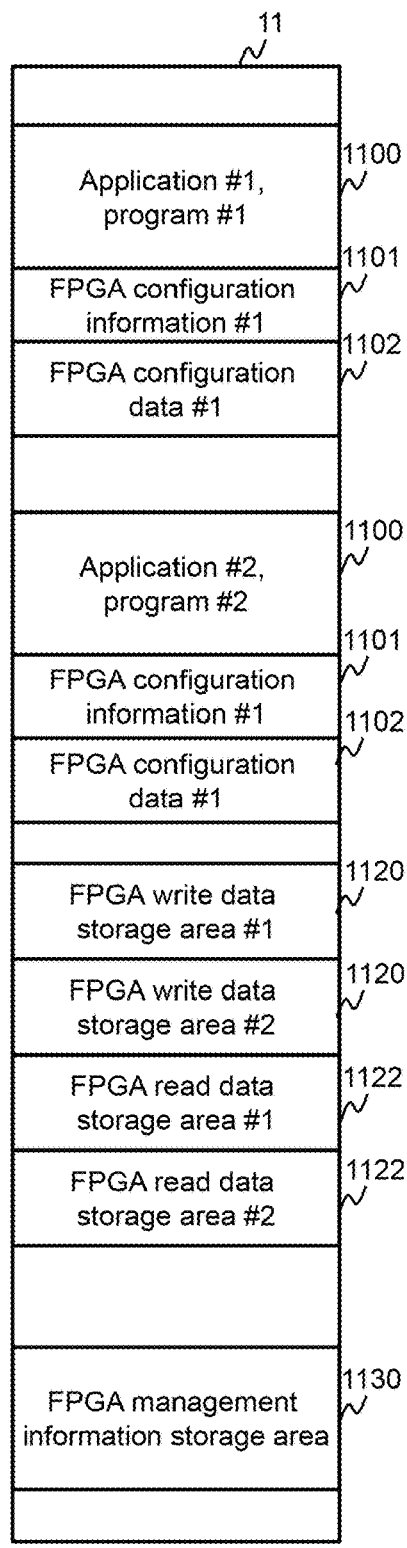
FIG. 4 illustrates a conceptual diagram of a memory map of a memory according to the first embodiment.

FIG. 4 illustrates a conceptual diagram of a memory map of the memory 11 used by the processor 10.

As the size for each area differs depending on the application to be used, it is not specifically depicted in FIG. 4. For example, for each application 101, there may be a program 1100, FPGA configuration information 1101 and FPGA configuration data 1102. More particularly, with regard to the application #1, for example, application #1 program #1, FPGA configuration data #1 and FPGA configuration information #1 that include the functions used by application #1 (corresponding FPGA device information, and size and storage address of FPGA configuration data and the like) are necessary. In addition, with regard to the application #2 as well, the application #2 program #2, the FPGA configuration information #2, and the FPGA configuration data #2 are necessary. Herein, the program 1100 and the FPGA configuration data 1102 of each application may be compiled by the computing apparatus 1 to create data, or data compiled in the same environment may be brought in for use.

In addition, the memory 11 includes an FPGA write data storage area 1120 to be used when offloading portions of the application processing to the FPGA 12; more particularly, there may be respective FPGA write data storage areas #1 and #2 corresponding to each of the applications #1 and #2. Each of these areas is an area for storing input data to be transferred to the FPGA 12. Further, the memory 11 includes an FPGA read data storage area 1122; more particularly, FPGA read data storage areas #1 and #2 corresponding to the applications #1 and #2 respectively. Each of these areas is an area for storing result data after processing by the FPGA 12. These data storage areas may be dynamically secured when necessary, or may be reserved statically in advance. In addition, the write data storage area and the read data storage area may be the same area (that is, one unit).

Figure 5:
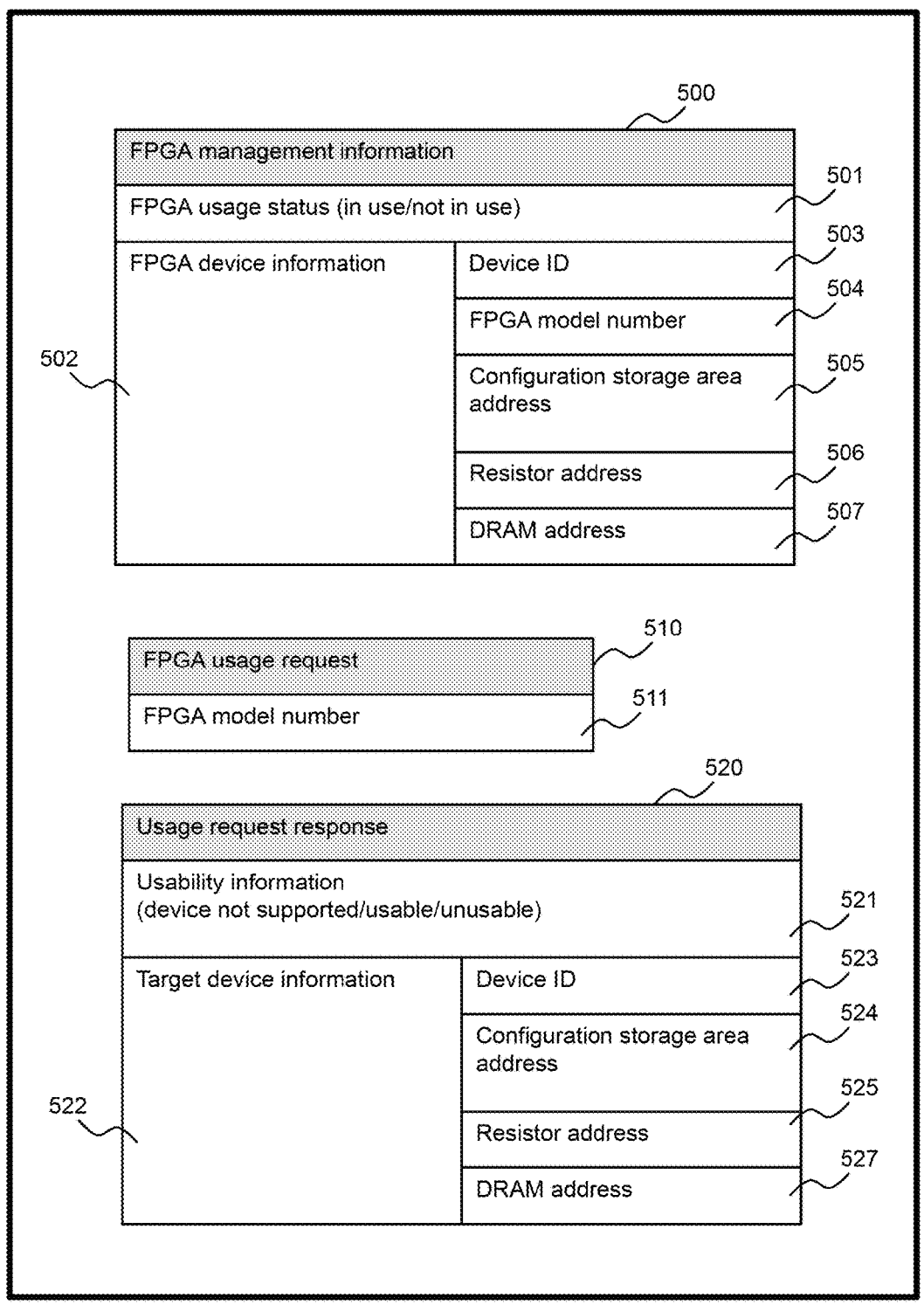
FIG. 5 illustrates an example of FPGA management information, a usage request, and a usage request response according to the first embodiment.

Furthermore, the memory 11 includes an FPGA management information storage area 1130 that can only be accessed by the FPGA management unit 103. FPGA management information is stored in the FPGA management information storage area 1130. FIG. 5 illustrates an example of the FPGA management information 500. The FPGA management information 500 can roughly be classified into two types: FPGA device information 502 of the FPGA 12, and FPGA usage status 501. The FPGA device information 502 includes information necessary for accessing the FPGA 12, such as an FPGA model number 504 (information representing a model number of the FPGA 12), a bus number connection destination PCIe, a DRAM address 507 (information indicating an address of the FPGA memory 13), a configuration storage area address 505 (information indicating the address of the configuration data storage area 121), a register address 50 (information indicating the address of the FPGA register), and the like. Also, the FPGA device information 502 includes a device ID 503 (information indicating a device ID which is a unique identifier assigned to each FPGA 12). According to the present embodiment, separate FPGA management information 500 exists for each FPGA 12. If the FPGA management information 500 is to be managed using only the model number of the FPGA 12, when there are a plurality of FPGAs 12 with the same model number, it may become unclear which FPGA 12 corresponds with which FPGA management information 500. Accordingly, in the present embodiment, in addition to the model number, a device ID for uniquely identifying the FPGA 12 is used. It should be noted that a plurality of FPGAs 12 may be present regardless of whether they have the same model number or different model numbers, but in the present embodiment, it is assumed that there is only one FPGA 12.

At the time that the computing apparatus 1 is powered-on, or when connection of a new device to the computing apparatus 1 has been detected, the FPGA device information 502 is obtained by searching for the connected FPGA and collecting information for the connected FPGA device. As a result, the FPGA connected to the computing apparatus 1 may be used. Although the FPGA device information 502 is specifically described with respect to the present embodiment, the FPGA device information 502 is not limited to the types of information described herein, and based on the condition that it may be used to facilitate access to the FPGA 12, other types of information are possible regardless of format. The FPGA usage status 501 is primarily information that indicates whether the FPGA 12 corresponding to the FPGA management information 500 is in use or not in use. Although other types of information are also managed according to each embodiment, the necessary data differs for each embodiment, and therefore specific examples will be described below.

Returning to FIG. 2, an operation flow for when the applications #1 and #2 operate at the same time with reference to the processing time of FIG. 3 will be described.

As the processor 10 of the present embodiment is a multi-core processor, it is possible to start simultaneously with each core.

First, at time T1 of FIG. 3, the application #1 transmits a usage request of the FPGA 12 to the FPGA management unit 103. As shown in FIG. 5, the usage request 510 includes an FPGA model number 511 (information representing a model number of the FPGA 12). The usage request response 520, which is a reply to the usage request 510, includes usability information 521 and target device information 522 (the usability information 521 and target device information 522 will be described in more detail later).

Figure 6:
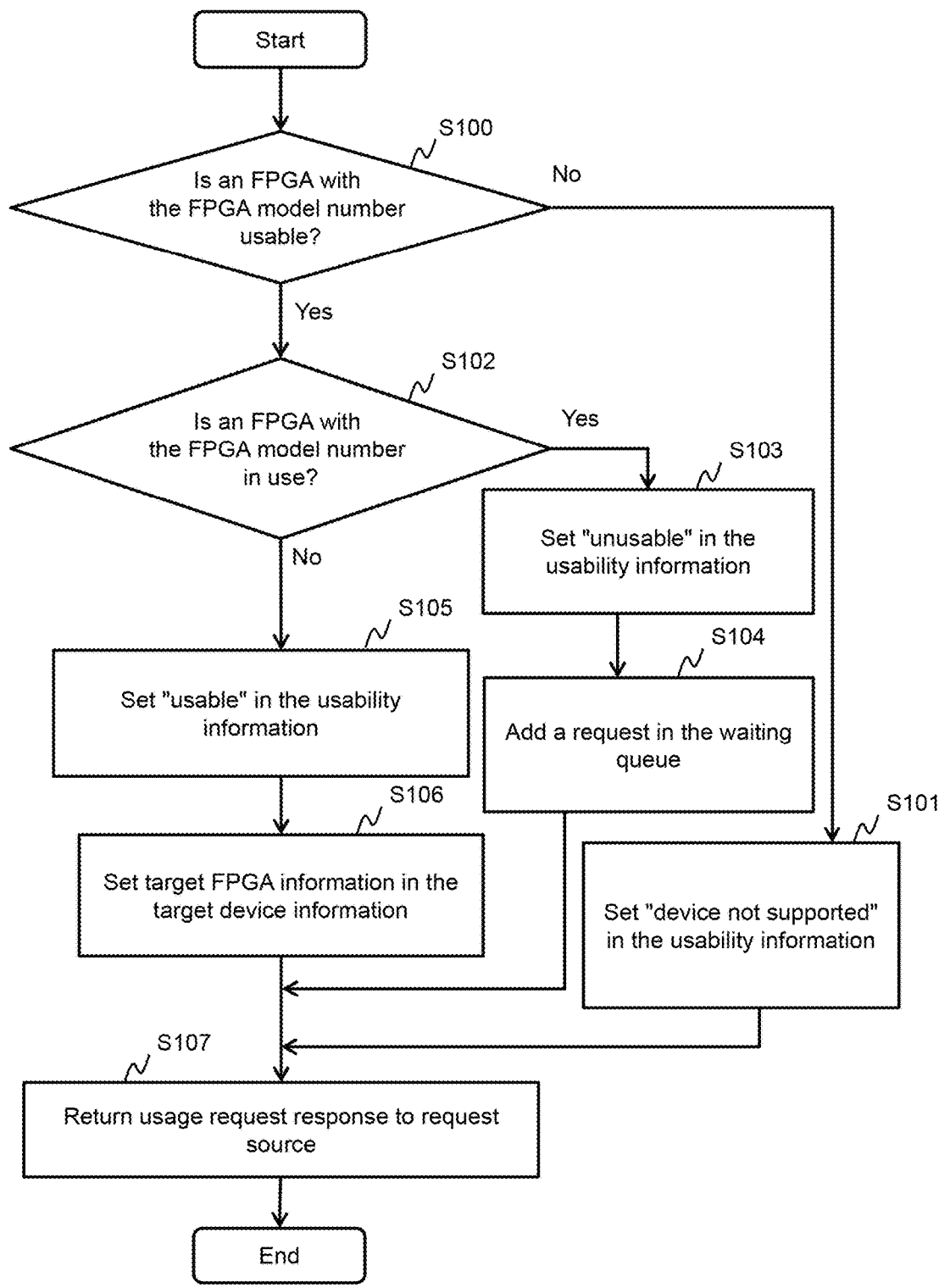
FIG. 6 is a flowchart illustrating a process performed by an FPGA management unit that has received a usage request according to the first embodiment.

FIG. 6 is a flowchart illustrating an operation flow of the FPGA management unit 103 that has received the usage request 510.

First, the FPGA management unit 103 determines whether there is an available FPGA 12 based on the FPGA model number 511 in the received usage request 510 (S100). That is, the FPGA management unit 103 judges the presence or absence of FPGA management information 500 including an FPGA model number 504 that matches the FPGA model number 511.

When FPGA management information 500 including an FPGA model number 504 that matches the FPGA model number 511 is not present, the FPGA management unit 103 sets a status of "Device Not Supported" in the usability information 521 (S101), and return a usage request response 520 of "Device Not Supported" to the request source application (S107).

When FPGA management information 500 including the FPGA model number 504 that matches the FPGA model number 511 is present, the FPGA management unit 103 determines whether or not the value of the FPGA usage status 501 in the FPGA management information 500 including the matched FPGA model number 504 indicates "In Use;" that is, whether or not the target FPGA 12 is being used (S102). In the present description, the "target FPGA" refers to the FPGA 12 corresponding to the device ID 503 in the FPGA management information 500 including the matched FPGA model number 504. In this embodiment, as there is only one FPGA 12, the target FPGA 12 is the FPGA 12 described above.

If the target FPGA 12 is not in use, the FPGA management unit 103 changes the FPGA usage status 501 to "In Use," and subsequently set a status of "Usable" in the usability information 521 (S105). Next, the FPGA management unit 103 sets information included in the FPGA device information 502 in the FPGA management information 500 including the matched FPGA model number 504; that is information for accessing the target FPGA 12 in the target device information 522 (S106). Here, the target device information 522 includes a configuration storage area address 524 (information indicating an address of the configuration data storage area 121 of the target FPGA 12), a register address 525 (information indicating an address of a register of the target FPGA 12), and a DRAM address 526 (information indicating the address of the FPGA memory 13 of the target FPGA 12). The target device information 522 may include a device ID 523 (information indicating a device ID uniquely identifying the target FPGA 12). The information 523 to 526 may be copies of the information 503 and 505 to 507 in the FPGA management information 500 corresponding to the target FPGA 12. Finally, the FPGA management unit 103 returns a usage request response 520 including a message of "Usable" to the request source application (S107).

In contrast, when the target FPGA 12 is in use, the FPGA management unit 103 may set a status of "Unusable" in the usability information 521 (S103). Information for accessing the target FPGA 12 is not set as the target device information 522 in the usage request response 502 [t1] including the status of "Unusable." Subsequently, the FPGA management unit 103 loads the request (usage request 510) in the FPGA usage waiting queue (not shown) that manages the queuing of the target FPGA 12, and then returns a usage request response 520 including the status of "Unusable" to the request source application (S107).

The above description relates to an operation flow of the FPGA management unit 103 that received the usage request 510.

In the example of FIG. 2, as the FPGA 12 is unused at the time T1 of the application #1 issuing the usage request 501 usage request 501 (S21), the application #1 receives a usage request response 520 having both a status of "Usable" as well as the target device information 522 (S22). The application #1 (101) which receives the usage request response 520 including the status of "Usable", loads the FPGA configuration data #1 to be used into the configuration data storage area 121 of the FPGA 12 (S23) based on the configuration storage area address 524 in the usage request response 520. At this point, the processor 10 may transfer the FPGA configuration data #1 several bytes at a time, or it may make use of a Direct Memory Access (DMA) circuit (not shown) included within the processor 10, the FPGA 12, or another device to burst transfer the FPGA configuration data #1. After loading of the FPGA configuration data #1 is completed, the FPGA management unit 103 stores the input data in the FPGA write data storage area #1, secure an area of the FPGA memory 13 based on the DRAM address 526 in the usage request response 520, and write the input data to the secured area (S24). Subsequently, the application #1 designates the address on the FPGA memory 13 for the input data, an address on the FPGA memory 13 for storing result data, and an argument of the kernel unit (a processing execution unit in the FPGA 12; the operation differs for each application) of the FPGA 12 (not shown), to activate the kernel unit of the FPGA 12 (S25). Upon activation of the kernel unit, the kernel unit of the FPGA 12 reads the input data in the FPGA memory 13, performs kernel unit processing, and writes the result back to the FPGA memory 13 (S28). When the kernel unit processing is completed, the kernel unit of the FPGA 12 issues a completion notification to the application #1 (S29).

Upon receiving the completion notification, the application #1 reads the result data from the FPGA memory 13 (S30) and stores it in the read data storage area #1 of the memory 11. Thereafter, the application #1 issues a usage completion notification of the FPGA 12 to the FPGA management unit 103 (S31), and continues the remaining software processing of the application #1.

Figure 7:
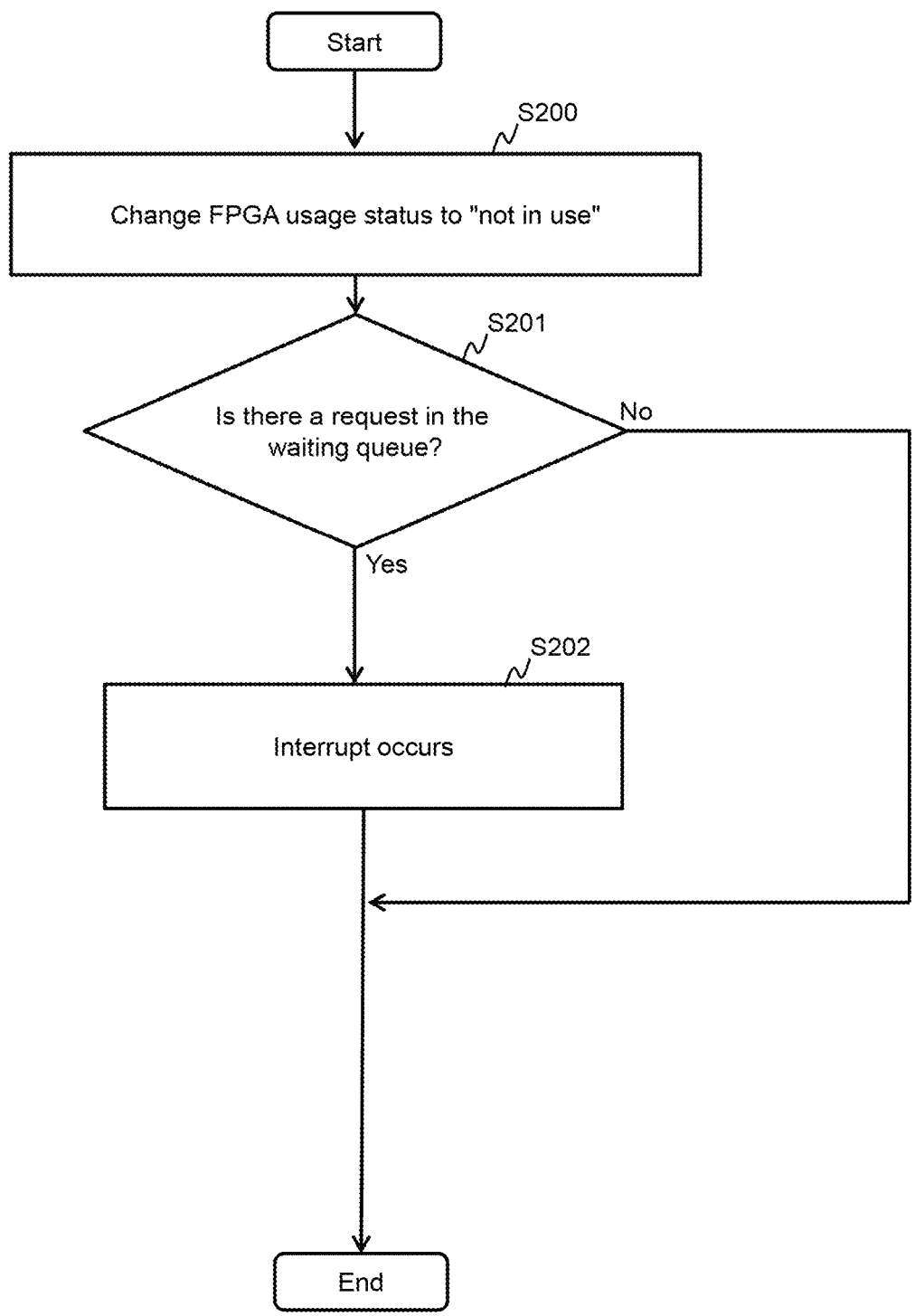
FIG. 7 is a flowchart illustrating a usage completion notification process according to the first embodiment.

Next, the operation of the application #2 running simultaneously with the application #1 will be described. The application #2 which is activated at the same time as the application #1 transmits a usage request 510 to the FPGA management unit 103 at time T2 (S26). However, as the application #1 is using the FPGA 12 from time T1, earlier than time T2, the FPGA management unit 103 sets the request (the usage request 510) in the FPGA usage waiting queue (S102 to 5104 in FIG. 6). That is, the FPGA management unit 103 manages the request (usage request 510) as a usage request in a waiting state. Then, the FPGA management unit 103 returns a usage request response 520 including a status of "Unusable" to the application #2 (S27). Upon receiving the usage request response 520 including the "Unusable" status, the application #2 enters a waiting state until the FPGA 12 becomes usable. Here, when the time becomes T3 and the application #1 completes the usage of FPGA 12 and notifies the FPGA management unit 103 of the use completion (S31), the FPGA management unit 103 performs the usage completion notification process illustrated in FIG. 7. First, the FPGA management unit 103 changes the FPGA usage status 501 (In Use flag) to "Not in use." Next, the FPGA management unit 103 monitors the FPGA usage waiting queue, and sets the FPGA usage status 501 to "In use" when there is a usage waiting request (usage request 510) and issues an interrupt providing usage permission to the request source application #2 (102) (S32 in FIGS. 2 and S202 in FIG. 7). Note that although each step is described in FIG. 7, embodiments in which, for example, S200 and S201 are reversed, or multiple steps are performed at once are also possible. In addition, examples of issuing an interrupt for providing usage permission have been described, but other methods for notifying the application, such as transmitting messages or providing notification via a flag in a shared memory are also possible.

The application #2 which receives usage permission interrupt stores the FPGA configuration data #2 in the configuration data storage area 121 of the FPGA 12 (S33), and writes the input data to the FPGA memory 13 (S34). Subsequently, the application #2 (102) set an argument in the kernel unit and activate the kernel unit of the FPGA 12 (S35). The kernel unit of the FPGA 12 reads the input data in the FPGA memory 13, perform processing of the kernel unit, and write the result back to the FPGA memory 13 (S36). Upon receiving the kernel completion notification (S37), the application #2 reads the result data (S38) and notifies the FPGA management unit 103 of the usage completion. Subsequently, the application #2 continues software processing.

As described above, the FPGA management unit 103 includes the interface for accepting a plurality of usage requests 510, and performs an exclusivity control to prevent simultaneous usage of the same FPGA 12. Accordingly, when a particular application is using the FPGA 12, error states resulting from other applications using the same FPGA 12 are prevented, and efficient use of FPGA resources are possible by managing interrupts or the queue.

Figure 8:
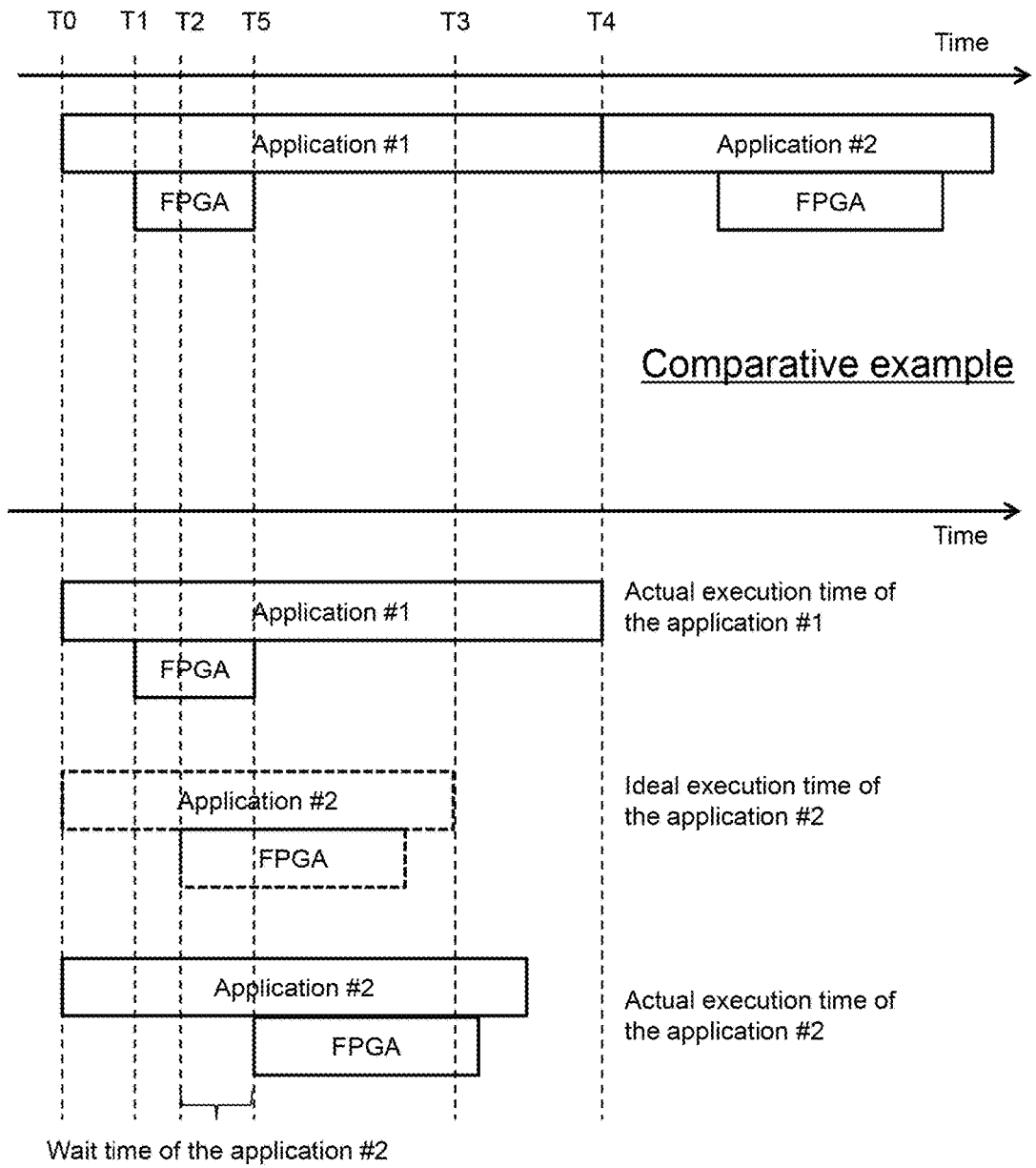
FIG. 8 illustrates an example of an effect of a comparative example as well as an example of an effect of the first embodiment.

Effects of the present embodiment are depicted in FIG. 8.

The upper part of FIG. 8 illustrates an example of the effect of a comparative example (an example that does not make use of the present embodiment). In the comparative example, the user executing the application judges the usage status of the FPGA and executes the two applications. In this case, the user first executes the application #1, and after confirming that the processing of the application #1 is completed, the user activates the application #2. As a result, in total, the execution time of application #1 plus the execution time of application #2 are required.

In contrast, the lower part of FIG. 8 illustrates an example of the effect of present embodiment. In the present embodiment, the application #1 finishes in an ideal state in the same way as if it is operated as a single unit. Also, for the application #2 operating in parallel, a waiting time only arises for the FPGA 12 between time T2 and time T5, such that application #2 finishes later than the ideal execution completion time of T3. However, as it still finishes earlier than the end time T4 of the application #1, it can be seen that using time division techniques for the application #1 and the application #2 can allow for effective use of the FPGA 12.

Figure 9:
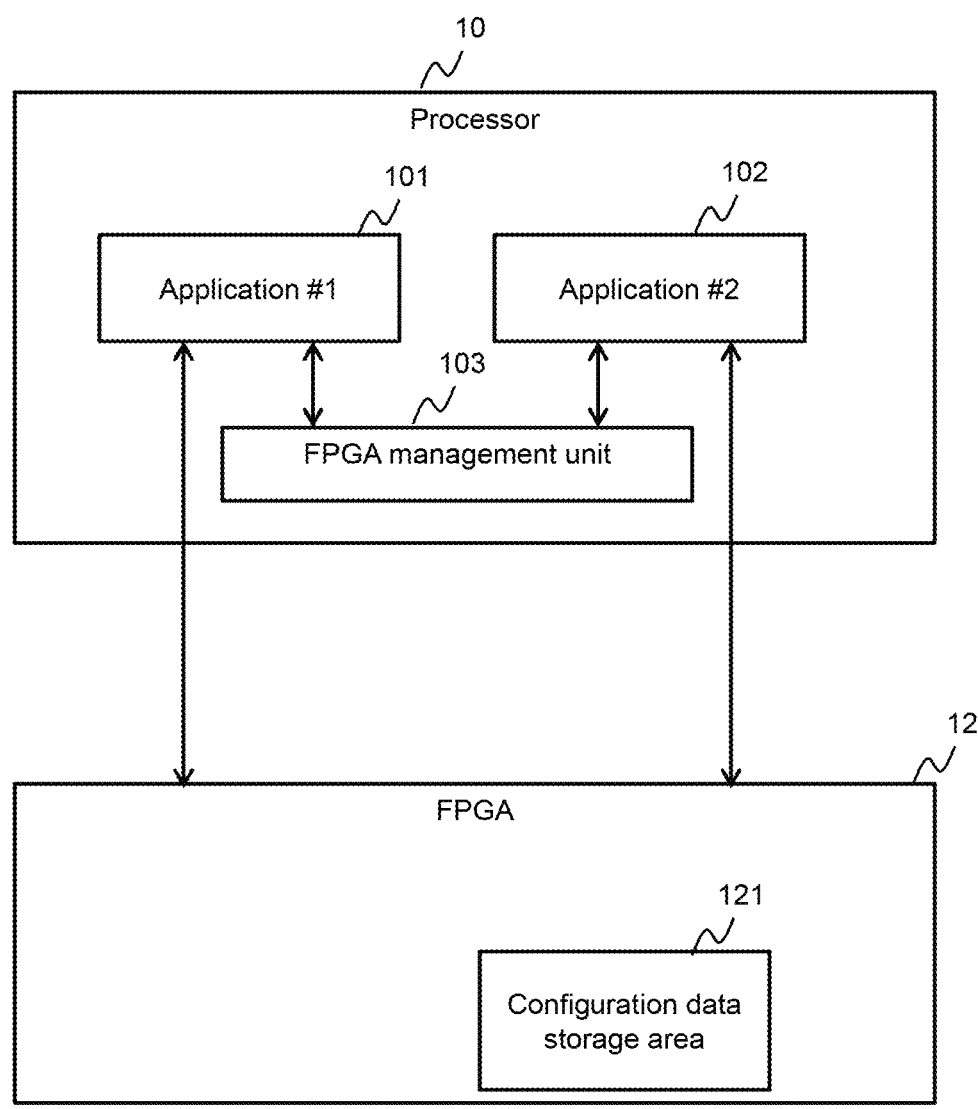
FIG. 9 illustrates a conceptual diagram of the first embodiment.

FIG. 9 illustrates a conceptual diagram of the present embodiment.

The application #1 and the application #2 issue a usage request 510 to the FPGA management unit 103 when using the FPGA 12. Here, based on the current usage state of the FPGA 12, the FPGA management unit 103 returns a usage request response 520 including "Usable" if the FPGA 12 is unused, and returns a usage request response 520 including "Unusable" if the FPGA 12 is currently in use. In this way, by always querying the FPGA management unit 103 when using the FPGA 12, it is possible to prevent an error state arising from two or more different applications using the FPGA 12 at the same time.

The above is a description of the first embodiment. With respect to the first embodiment, for instance, modifications such as those described below are considered.

[First Modification of the First Embodiment]

In the first modification of the first embodiment, in addition to the FPGA model number 511, the usage request 510 may include an address of the FPGA configuration data managed by the request source application. In particular, for example, when the application #1 is the request source, the usage request 510 may include a configuration address (information indicating the address of the FPGA configuration data #1) corresponding to the application #1. When the FPGA management unit 103 receives such a usage request 510, if the FPGA 12 is not in use, the FPGA management unit 103 loads the FPGA configuration data #1 into the configuration data storage area 121 of the FPGA 12 from the configuration address (address of the memory 11) indicated by the received usage request 510, and subsequently returns a usage request response 520 to the application #1. Even if the FPGA 12 is in use, once the FPGA 12 becomes available, the FPGA management unit 103 provides an interrupt to the application #1 after loading the FPGA configuration data #1 into the configuration data storage area 121 of the FPGA 12. Accordingly, there is no need to include the configuration storage area address 524 in the usage request response 520. As a result, this has the benefit that the application 101 need not be aware of the address of the configuration data storage area 121 of the FPGA 12.

[Second Modification of the First Embodiment]

In the second modification of the first embodiment, the application 101 that receives "Unusable" included in the usage request response 520 may issue a cancellation request with respect to use of the FPGA. Upon receiving the cancellation request, the FPGA management unit 103 deletes a request corresponding to the cancellation request from among the usage requests 510 in the usage waiting queue. In this way, it is possible to select a configuration in which the application 101 performs the processing using software (that is, the application 101 itself executes processing instead of offloading processing to the FPGA 12).

[Third Modification of the First Embodiment]

When it is known how long the application 101 will have to wait before being allowed to use the FPGA, it is a simple matter to decide whether or not the application 101 should cancel the FPGA usage. Accordingly, in the third modification of the first embodiment, the usage request 510 may include the input data size (information indicating the size of the input data). That is, the FPGA management unit 103 may calculate the predicted processing time based on not only the FPGA usage state, but also based on the input data size within the received usage request 510. The FPGA management unit may then store the predicted processing time (the time to be taken for the processing responding to the received usage request 510, which is estimated based on the size of the input data) and the start time. In this way, when the usage request 510 is received while the FPGA 12 is in use, the FPGA management unit 103 may calculate the predicted completion time based on the predicted processing time, the start time, and the current time, and return a usage request response 520 including both "Not Usable" as well as the predicted completion time. As a result, the application 101 can select whether to perform processing using software or wait until the FPGA 12 is available based on the predicted completion time, and it is possible for each application 101 to be processed by the fastest method.

Second Embodiment

Herein, a second embodiment will be described. Herein, the description will focus on the differences from the first embodiment, and description of the similarities with the first embodiment will be omitted or simplified.

With respect to the second embodiment, a cloud environment will be described as an example. In the present description, the term "cloud" refers to an example of a computing system composed of one or more computing apparatuses.

Figure 10:
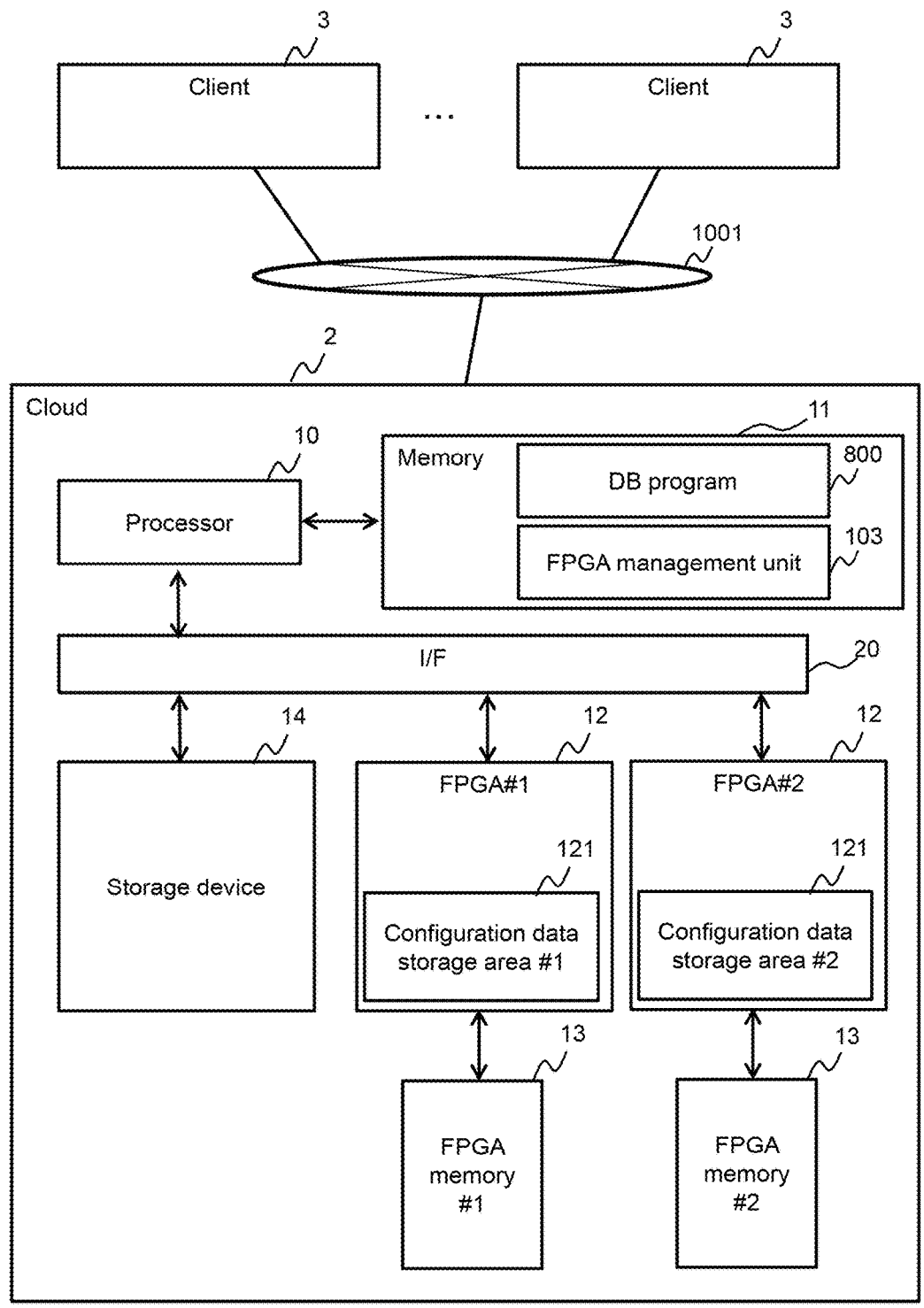
FIG. 10 illustrates a configuration of a cloud according to a second embodiment.

FIG. 10 illustrates a configuration of a cloud according to the second embodiment.

Components common to those of the computing apparatus 1 are denoted by the same reference numerals, and descriptions thereof are omitted. In terms of components, the difference from FIG. 1 is that two FPGAs 12 are included. Put differently, FPGA #1 and #2 are present. Also, as cloud 2 is utilized, a plurality of clients 3 are connected via the network 1001. The client 3 is, for example, a computing apparatus such as a personal computer. Also, similarly to the first embodiment, it is assumed that the processor 10 is a four-core multi-core processor.

In the second embodiment, a case that a middleware database program (hereinafter referred to as a DB program) 800 is executed on the processor 10 as an application executed in the cloud 2 is described. In this case, the DB program 800 can accept SQL from a plurality of clients 3. In addition, it is assumed that the DB program 800 may support multi-threading, such that when multiple SQLs arrive, the DB program 800 can divide SQLs into a plurality of threads and process the threads in parallel by a plurality of cores. In the present embodiment, "SQL" is an instruction described in Structured Query Language. In place of SQL, instruction written in other kinds of languages may also be used.

Figure 11:
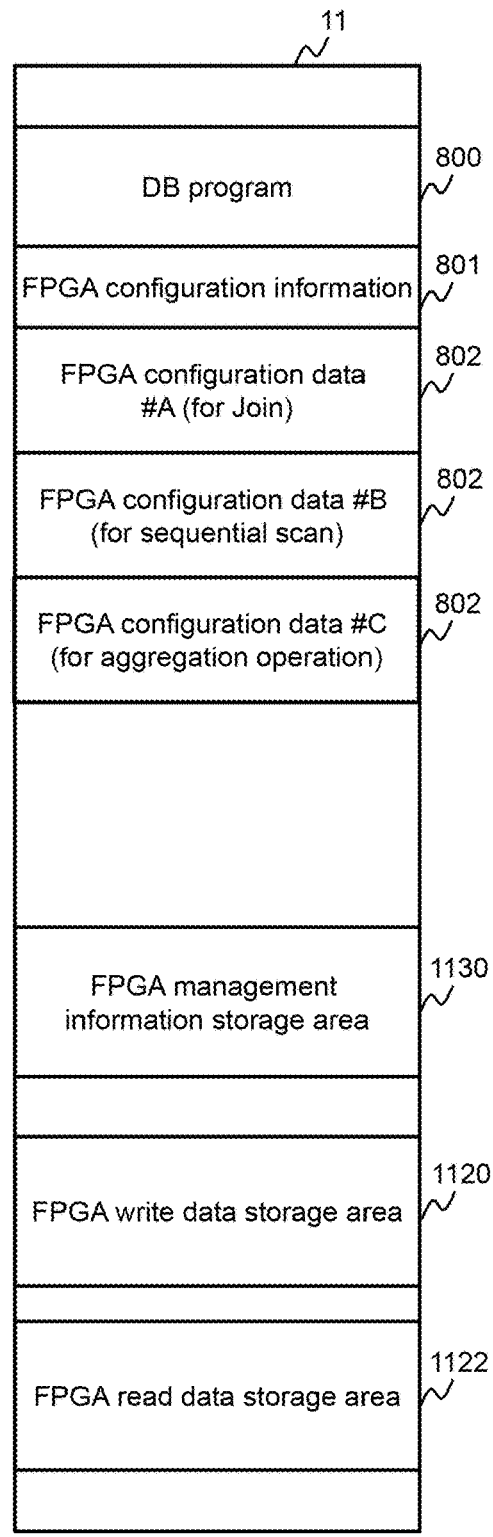
FIG. 11 is a conceptual diagram of a memory map of a memory according to the second embodiment.

FIG. 11 is a conceptual diagram of the memory map of a memory 11 according to the second embodiment.

The memory 11 includes the DB program 800 and FPGA configuration data 802 for each function of SQL. More particularly, for example, it is assumed that there are three kinds of FPGA configuration data 802 including FPGA configuration data #A for Join processing, FPGA configuration data #B for sequential scanning, and FPGA configuration data #C for aggregating calculation. Further, the memory 11 includes FPGA configuration information 801 indicating the information of the configuration data #A through #C. Herein, an example has been described in which the FPGA configuration information 801 stores three pieces of information in one area, but configurations in which there are separate areas of FPGA configuration information 801 for each kind of FPGA configuration data are also possible.

Figure 12:
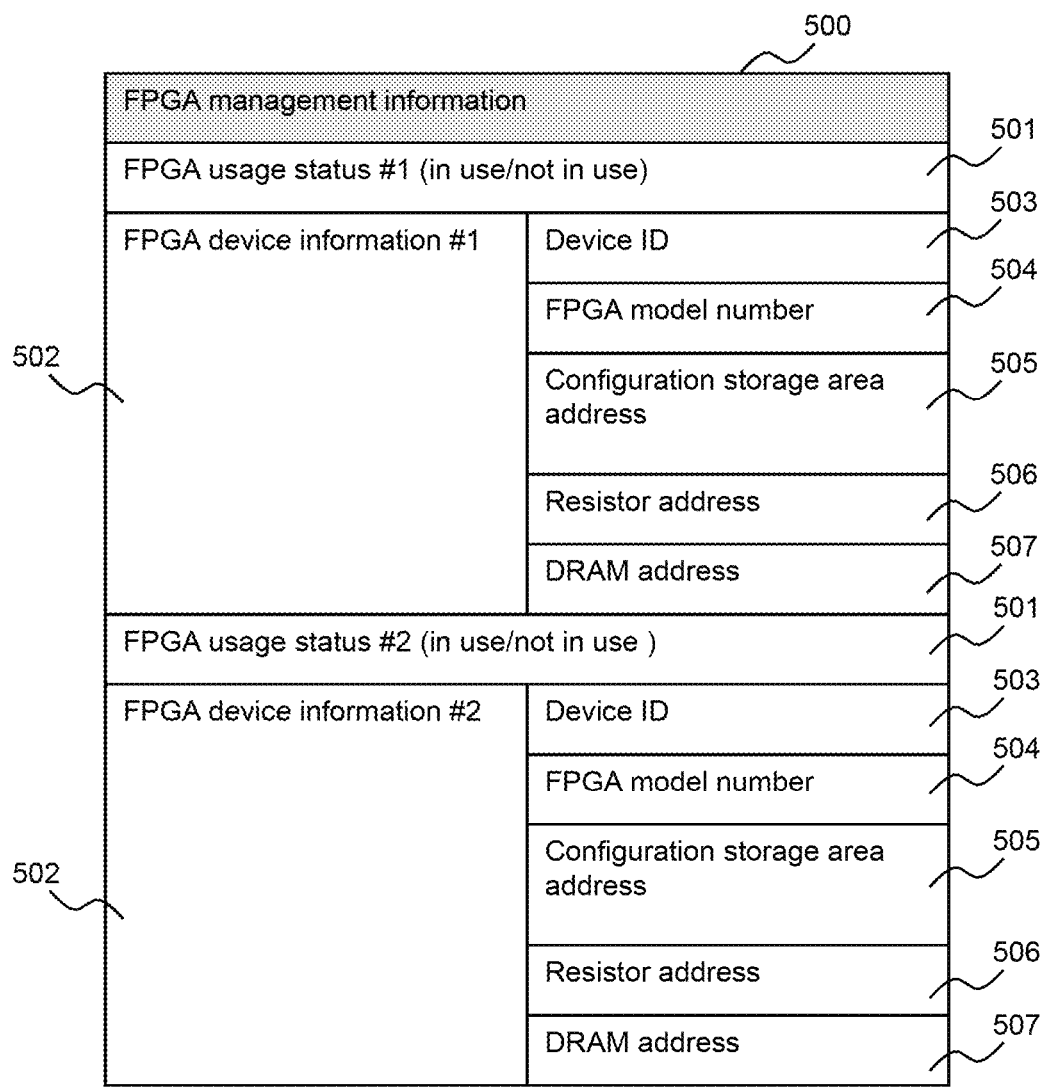
FIG. 12 illustrates an example of FPGA management information according to the second embodiment.

FIG. 12 illustrates an example of FPGA management information according to the second embodiment.

In the present embodiment, as there are two FPGAs 12, both the FPGA usage status 501 and the FPGA device information 502 exist for each FPGA 12. That is, there is FPGA usage statuses #1 and #2 corresponding to FPGAs #1 and #2, respectively. Similarly, there is FPGA device information #1 and #2 corresponding to FPGAs #1 and #2, respectively. In this embodiment, an example that two FPGAs 12 exist are described, but any number of FPGAs 12 may be used. In such a case, a number of FPGA usage statuses 501 and a number of FPGA device information 502 corresponding to the number of FPGAs 12 may exist.

Herein, when SQL #1 (Join process), SQL #2 (sequential scan process), and SQL #3 (aggregating calculation process) are received from the client 3, the DB program 800 establishes three threads (DB process #1, DB process #2, DB process #3) and processes the threads in parallel on each core. When using the FPGA 12, each of the DB processes #1 to #3 issues a usage request 510 to the FPGA management unit 103. The FPGA management unit 103 loops the processing of S100 to S106 of FIG. 6 a number of times equal to the number of FPGAs 12, at maximum. When an unused FPGA 12 is found, or all the FPGAs 12 are in use, the FPGA management unit 103 may return the usage request response of S107. Specific examples are described below.

For example, assume that usage requests 510 are issued in the order of DB process #1, DB process #2, DB process #3, sequentially. Regarding the usage request 510 from DB process #1, the FPGA management unit 103 first determines whether or not the FPGA #1 is in use. As FPGA #1 is not in use, the FPGA management unit 103 sets the FPGA usage status #1 of the FPGA #1 to "In Use," and transmits the usage request response 520 including the target device information 522 corresponding to the FPGA device information #1 to DB process #1. Next, regarding the usage request 510 from DB process #2, the FPGA management unit 103 first determines whether or not the FPGA #1 is in use, but as the FPGA #1 is in use, it next determines whether or not FPGA #2 is in use. As the FPGA #2 is unused, the FPGA management unit 103 sets the FPGA usage status #2 of the FPGA #2 to "In Use" and transmits the usage request response 520 including the target device information 522 corresponding to the FPGA device information #2 to DB process #2. Finally, with respect to the usage request 510 from DB process #3, as both FPGAs #1 and #2 are in use, the FPGA management unit 103 returns the usage request response 520 including "Unusable" to DB process #3.

Accordingly, even in configurations with multiple FPGAs 12, by storing FPGA device information 502 and FPGA usage statuses 501 for each FPGA, and determining whether or not each FPGA 12 is in use until an unused FPGA 12 is found by the FPGA management unit 103 that receives a usage request from a thread, the same effect as that of the first embodiment may be achieved. Further, in the case of a configuration includes a plurality of FPGAs 12, it is possible for the FPGA management unit 103 to conceal the management of a plurality of accelerators, such that the programmer of the application can program without concern for the presence of the plurality of FPGAs 12. Even in the configuration of the first embodiment, the same effect can be achieved. That is, even if a plurality of FPGAs 12 exist in the configuration of the first embodiment, the application programmer can program without concern for the presence of the plurality of FPGAs 12.

[First Modification of the Second Embodiment]

In the first modification of the second embodiment, the usage request 510 may include, in addition to the FPGA model number 511, a desired FPGA number which indicates the number of FPGAs 12 that the request source application wishes to use. As a result, the FPGA management unit 103 that has received the usage request 510 can specify the desired FPGA number based on the usage request 510.

Based on the number of unused FPGAs 12 designated by the availability (the FPGA usage status 501 corresponding to each of the plurality of FPGAs 12) of the FPGA (the unused FPGA number) and the desired FPGA number designated by the usage request 510, the FPGA management unit 103 may, for example, as in Formula 1, determine a number of FPGAs to be allocated (allocate FPGA number) and return the usage request response 520 that includes the allocate FPGA number along with target device information 522 for the number of the allocate FPGA number.

When (the unused FPGA number<the desired FPGA number), the allocate FPGA number is the unused FPGA number.

When (the unused FPGA number>=the desired FPGA number), the allocate FPGA number is the desired FPGA number.

(Formula 1)

[Second Modification of the Second Embodiment]

The allocate FPGA number is not limited to that defined by [Formula 1]. For example, in a cloud 2 including N (e.g., N=10) FPGAs 12, the maximum value of the allocate FPGA number is preset as a threshold value n (e.g., n is an integer of 2 or more), and when the FPGA management unit 103 receives the usage request 510 including the desired FPGA number of M (n<M=<N), the usage request response 520 including the allocate FPGA number with a maximum value of n may be returned regardless of the usage status of the FPGA 12 (for example, even if the unused FPGA number is larger than n).

[Third Modification of the Second Embodiment]

The FPGA management unit 103 may learn the frequency of the usage request 510, such that the allocate FPGA number may be based on the frequency of the usage request 510. For example, when it is determined that the frequency of the usage request 510 is low (for example, less than a threshold p), the FPGA management unit 103 may actively allocate the FPGA. In contrast, if it is determined that the frequency of the usage request 510 is high (for example, equal to or higher than the threshold p), the FPGA management unit 103 may determine that only one FPGA is permitted for use even in a situation where a multiple FPGAs are not in use.

[Fourth Modification of the Second Embodiment]

The FPGA management unit 103 may process the usage requests 510 in the usage wait queue in descending order based on the priority of each usage request 510, and a thread (or an application) may send usage request 510 including the desired FPGA number and priority level to the FPGA management unit 103. For example, with respect to usage request 510 with a substantially high priority level, the FPGA management unit 103 may allocate a number of FPGAs as long as there are unused FPGAs available (that is, even if the unused FPGA number is greater than the desired FPGA number, the allocate FPGA number may be the unused FPGA number). In addition, for example, with respect to usage requests 510 with low priority levels, the FPGA management unit 103 may put in place controls allowing use of multiple FPGAs in situations where after allowing usage of the desired FPGA number, there are still unused FPGAs (for instance, when the desired FPGA number is equal to the allocate FPGA number and there is at least one unused FPGA, the allocate FPGA number may be set equal to the desired FPGA number).

[Fifth Modification of the Second Embodiment]

In the second embodiment, two FPGAs having the same FPGA model number are mounted, but the present embodiment is not limited thereto, and, in the fifth modification of the second embodiment, a plurality of FPGAs 12 having different FPGA model numbers may be mounted. In such a configuration, as FPGA is unusable in S100 of FIG. 6, determination of the next device may be proceeded to. In addition, if the application has FPGA configuration data for each of the plurality of FPGA model numbers, the usage request 510 from the application may include information (for example, the address of the FPGA configuration data) about each of the plurality of FPGA model numbers. In this case, the FPGA management unit 103 can determine which FPGA of FPGA model number among the plurality of FPGA model numbers is to be used.

Third Embodiment

Herein, a third embodiment will be described. The description herein will focus on the differences from the first embodiment, and description of the similarities with the first embodiment will be omitted or simplified.

Figure 13:
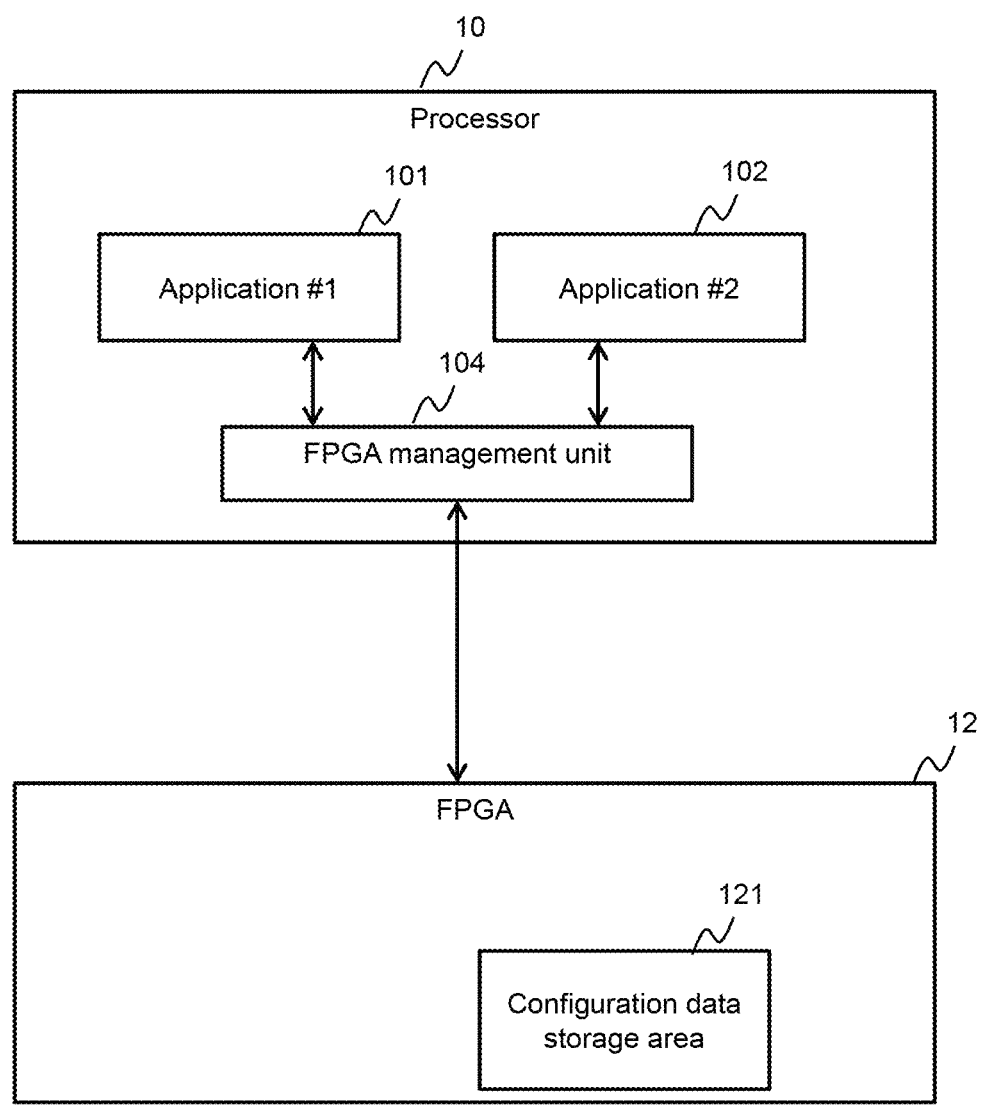
FIG. 13 illustrates a conceptual diagram of a third embodiment.

FIG. 13 illustrates a conceptual diagram of the third embodiment.

In the present embodiment, an FPGA management unit 104 is utilized in place of the FPGA management unit 103. The FPGA management unit 104 performs all access operations of the FPGA 12, and the applications #1 and #2 uses the FPGA 12 in a virtualized environment. That is, in the present embodiment, applications #1 and #2 do not access the FPGA 12 directly. Although present embodiment will be described using the computing apparatus 1 of FIG. 1, it is also applicable to a cloud as shown in FIG. 10.

Figure 14:
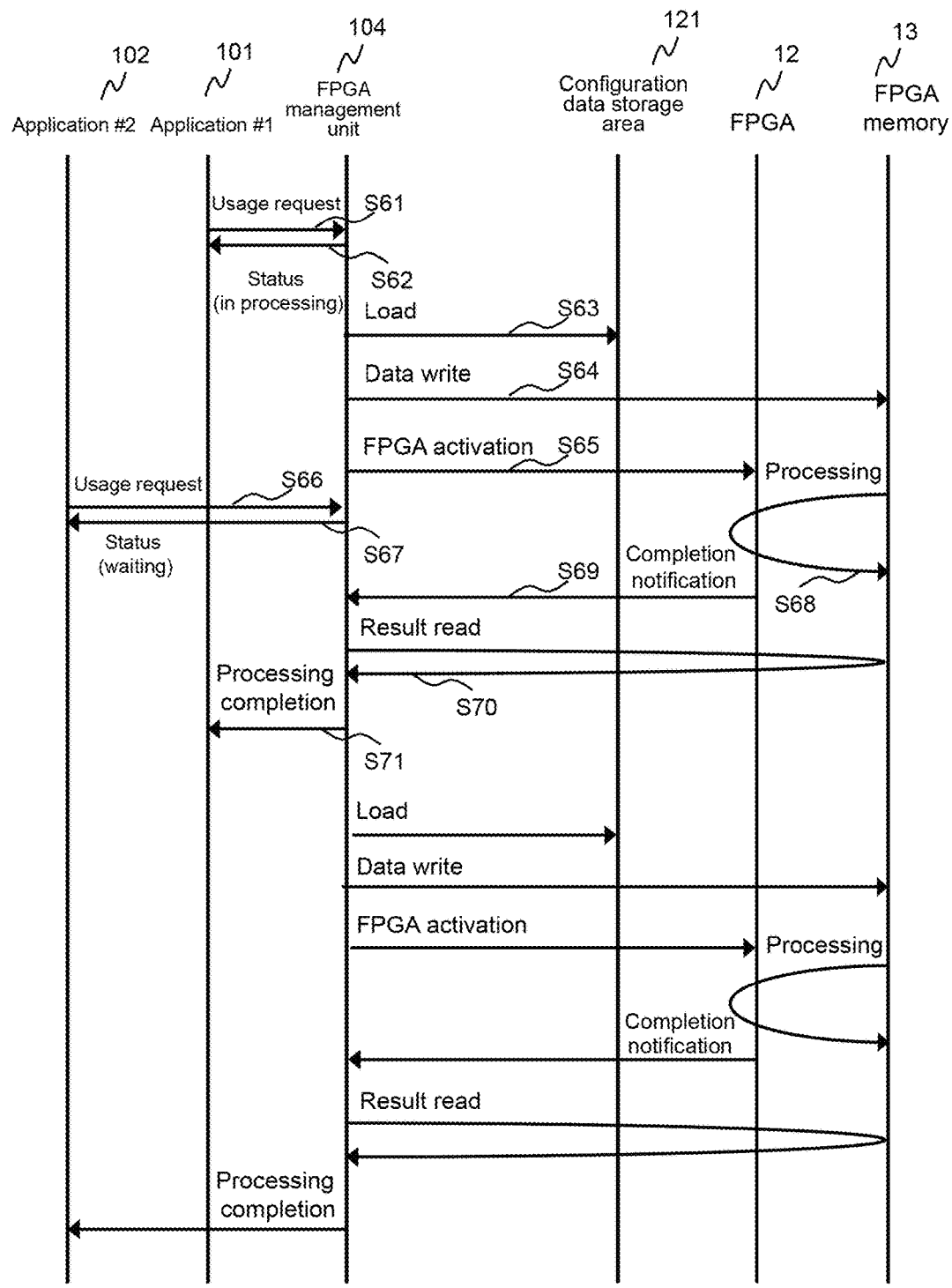
FIG. 14 illustrates an example of an operation flow when applications #1 and #2 operate simultaneously with respect to the third embodiment.

FIG. 14 illustrates an example of an operation flow of the present embodiment.

A case in which applications #1 and #2 operate at the same time similar to the first embodiment will be described.

Figure 15:
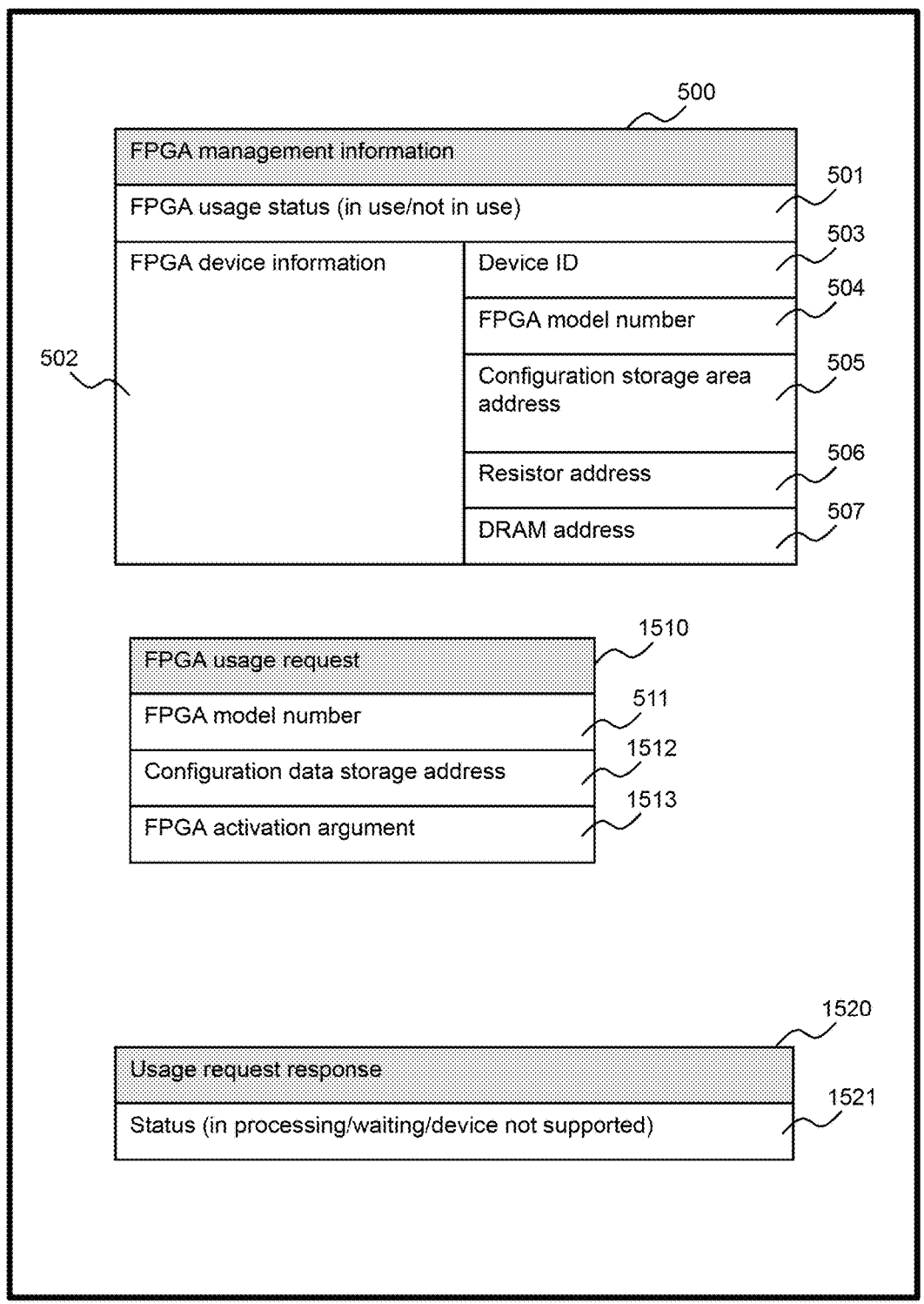
FIG. 15 illustrates an example of FPGA management information, a usage request, and a usage request response according to the third embodiment.

First, the application #1 transmits the usage request 1510 described in FIG. 15 to the FPGA management unit 104 at time T1 (S61). The usage request 1510 includes a configuration data storage address 1512 and an FPGA activation argument 1513 in addition to the FPGA model number 511. The configuration data storage address 1512 is information indicating the address of the FPGA configuration data #1 (see FIG. 4). The FPGA activation argument 1513 is a parameter related to FPGA activation, and includes, for example, an address of the input data, an argument of the kernel unit of the FPGA 12, a transfer of a result data storage address data, or the like. As illustrated in FIG. 15, the FPGA management information 500 is substantially the same information as in the first embodiment. The usage request response 1520 includes a status 1521. The status 1521 is information indicating the status of the usage request 1510.

Figure 16:
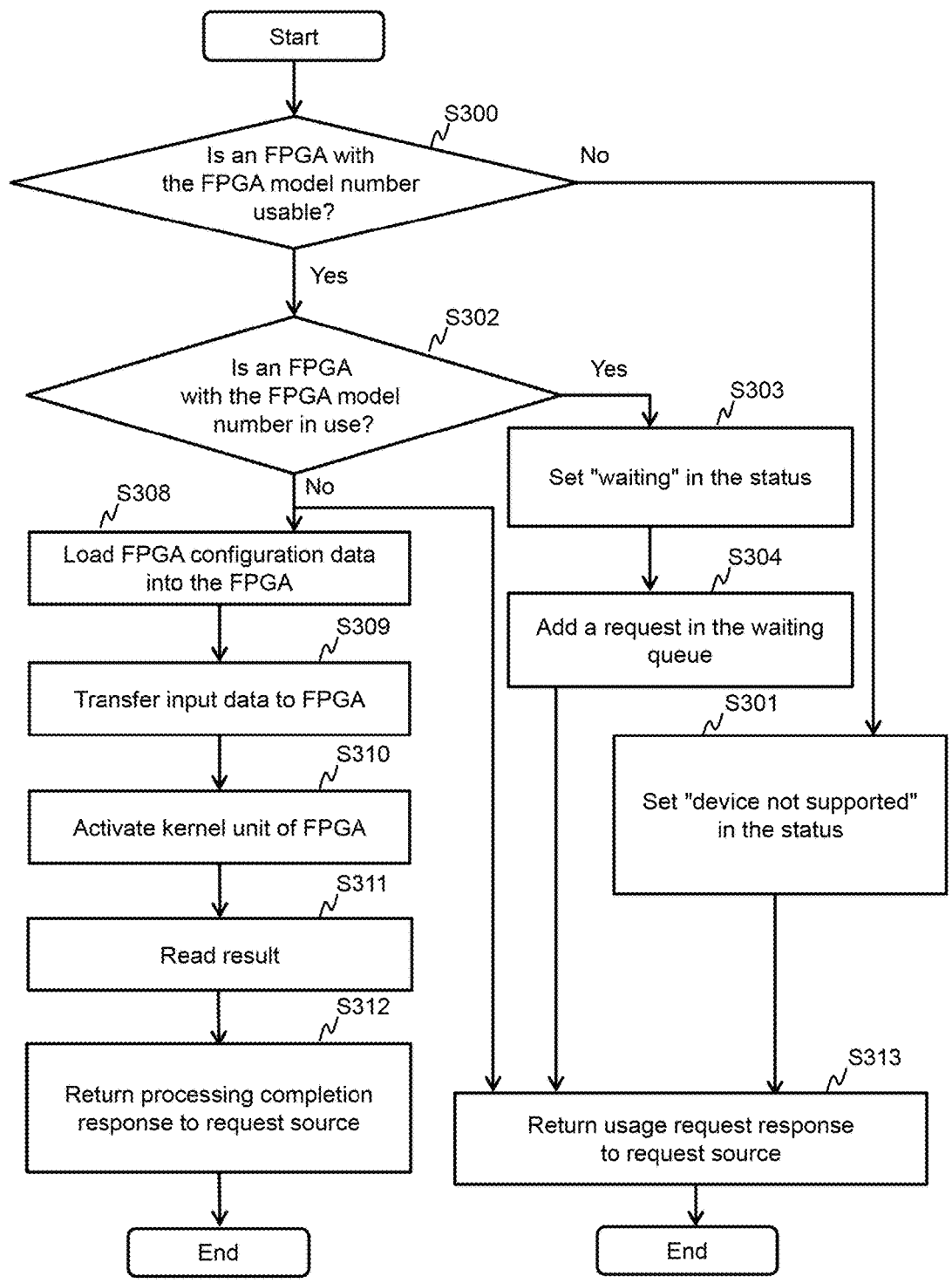
FIG. 16 is a flowchart illustrating a process performed by an FPGA management unit that has received a usage request according to the third embodiment.

FIG. 16 is a flowchart illustrating an operation flow of the FPGA management unit 104 which received the usage request 1510.

First, similarly to FIG. 6, the FPGA management unit 104 determines the presence or absence of FPGA management information 500 that includes an FPGA model number 504 that matches the FPGA model number 511 (S300). If there is no FPGA management information 500 that includes a matching FPGA model number 504, the FPGA management unit 104 sets "Device Not Supported" in the status 1521 (S301), and transmits a usage request response 1520 including the "Device Not Supported" to the request source application (S313).

When FPGA management information 500 that includes the matching FPGA model number 504 is present, the FPGA management unit 104 determines whether or not the FPGA usage status 501 in the FPGA management information 500 is "In Use" (S302).

When the FPGA usage status 501 is "In Use," the FPGA management unit 104 sets a message of "Waiting" in the status 1521 (S303) and loads a request (usage request 1510) in the FPGA usage waiting queue (S304). The FPGA management unit 105 returns a usage request response 1520 including the message "Waiting" to the request source application (S313).

In contrast, if the FPGA usage status 501 is "Not in use", the FPGA management unit 104 sets "In Processing" in the status 1521, and returns a usage request response 1520 including "In Processing" to the request source application (S313). At the same time, the FPGA management unit 104 loads the FPGA configuration data corresponding to the request source application into the configuration data storage area 121 (S308), and transfers the input data to the FPGA 12 (S309). Subsequently, the FPGA management unit 104 sets the arguments of the kernel unit of the FPGA 12, and activates the kernel unit (S310). Thereafter, the FPGA management unit 104 reads the result data (S311), and returns an FPGA process completion response to the request source application (S312). In FIG. 16, if the determination of S302 is "Yes," a reply of "Waiting," is quickly returned, but the FPGA management unit 104 may loop until the FPGA 12 becomes not in use, and not return the usage request response 1520 until the use of the FPGA 12 is completed. Also, in FIG. 16, when in S202 the determination is "No", "In Processing" is returned to the request source application, but the FPGA management unit 104 need not return "In Processing." In addition, the usage request response 1520 may include information such as the expected completion time (or the number of waiting requests) similar to the third modification of the first embodiment. In this way, the application that has received the usage request response including the status 1521 may perform other processing or may delay processing until it receives the processing completion notification from the FPGA management unit 104.

Returning to the example of FIG. 14, as the FPGA 12 is not in use at the point of time T1 at which the application #1 issued the usage request 1510, the FPGA management unit 104 returns a usage request response 1520 including "In Processing" to the application #1 (S62). The FPGA management unit 104 does loading the FPGA configuration data #1 from the memory 11 into the configuration data area 121 of the FPGA 12 (S63), writing the input data to the FPGA memory 13 (S64), and activating the FPGA 12 using the FPGA activation argument 1513 (S65). In this way, the input data is read and written back by the kernel unit of the FPGA 12 (S68), and the FPGA 12 sends a completion notification to the FPGA management unit 104 (S69). The FPGA 104 reads the result data from the FPGA memory 13 (S70) and transmits a completion notification to the application #1 (101).

The application #1 that has received the usage request response 1520 including "In Processing," may wait until the completion notification is received or perform another processing task. After a time, the application #1 receives the completion notification from the FPGA management unit 104 (S71). The application #1 that received the completion notification continues the remaining software processing.

Figure 17:
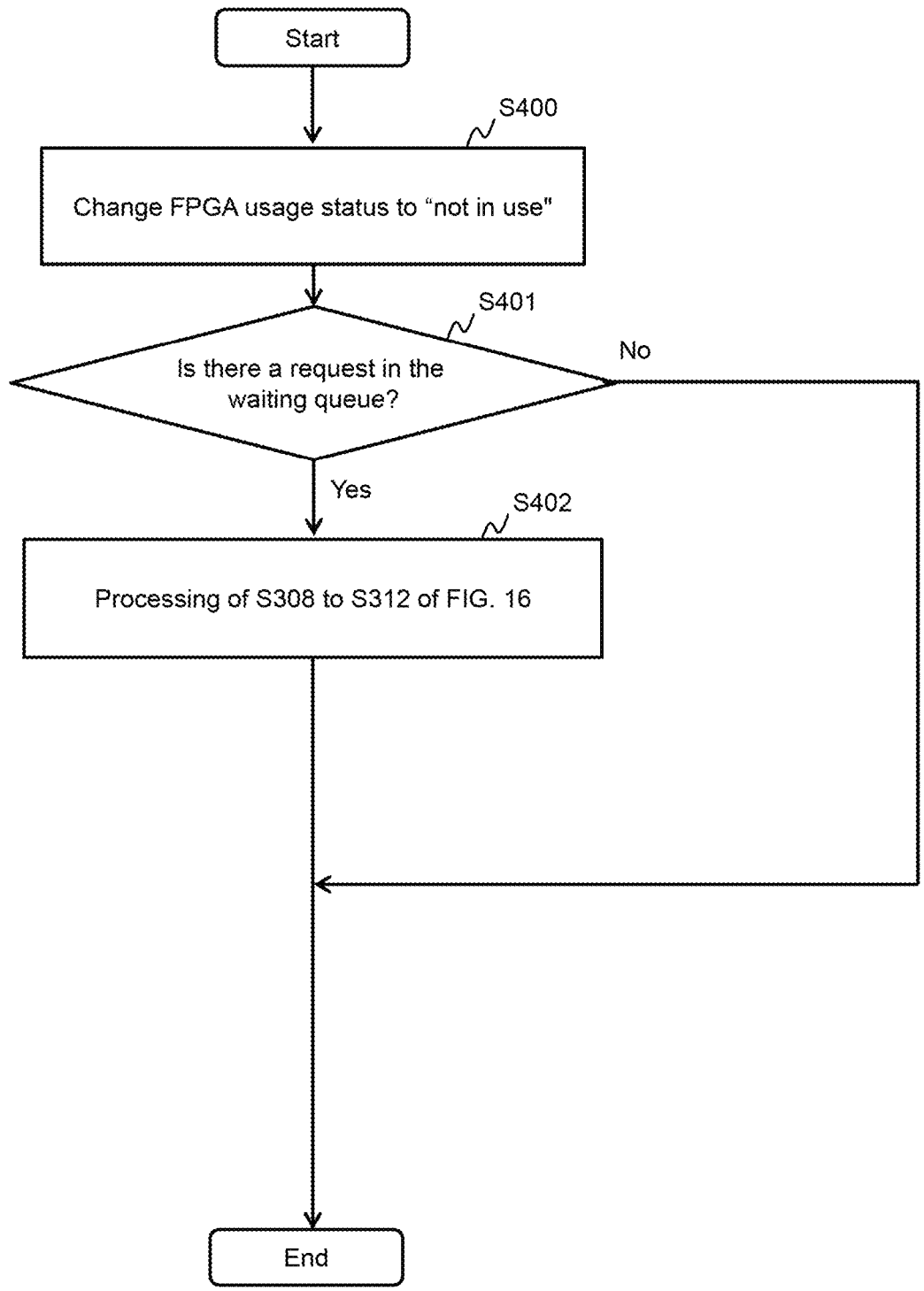
FIG. 17 is a flowchart illustrating a usage completion notification process according to the third embodiment.

Next, the operation of the application #2 running simultaneously with the application #1 will be described. The application #2, which has been activated at the same time as the application #1, transmits the usage request 1510 to the FPGA management unit 104 at time T2. However, as the application #1 is in use of the FPGA 12 from the time T1 earlier than the time T2, the FPGA management unit 104 determines a result is "Yes" at S302, sets the request (usage request 1510) in the FPGA usage waiting queue, and returns a usage request response 1520 including "Waiting" to the application #2 (102). The application #2 that received the usage request response 1520 including the "Waiting" enters a waiting state. Here, when the time becomes T3 and the application #1 finishes using the FPGA 12, the FPGA management unit 104 performs the usage completion notification process of the FPGA in FIG. 17. First, the FPGA management unit 104 changes the FPGA usage status 501 ("In Use" flag) to "Not In Use" (S400). Next, the FPGA management unit 104 monitors the FPGA usage waiting queue, and, if there is a usage waiting request (usage request 1510), changes the FPGA usage status 501 to "In Use" and performs the processing of S308 to S312 in FIG. 16. Note that although each step is described in FIG. 17, embodiments in which, for example, S400 and S401 are reversed, or multiple steps are performed at once are also possible. In addition, examples of interrupting for the usage permission have been described, but other methods for notifying the application, such as transmitting messages or notifying by a flag in a shared memory are also possible.

In the present embodiment, the FPGA management unit 104 performs all access operations to the FPGA 12, and the applications #1 and #2 uses the FPGA 12 in a virtualized environment. That is, in the present embodiment, applications #1 and #2 do not access the FPGA 12 directly. Put differently, the FPGA management unit 104 functions as a driver of the FPGA 12. As such, the application can offload a part of the application processing without being aware of the FPGA 12. That is, the application can be designed without needing to take into account the address of the FPGA 12.

[First Modification of the Third Embodiment]

In the first modification of the third embodiment, the FPGA management unit 104 may cache the FPGA configuration data 1102 once used, collect a usage frequency for each FPGA configuration data 1102, analyze the collected information, and, when the FPGA 12 is not in use, load the FPGA configuration data 1102 that has the highest likelihood of being used next into the FPGA 12 in advance. In this case, if the prediction is correct, as the FPGA configuration data 1102 of a usage target has already been loaded by the time the FPGA 12 is utilized, the loading time may be shortened. Even when the prediction is incorrect, the necessary FPGA configuration data 1102 may simply be loaded, such that there is no particular disadvantage.

[Second Modification of the Third Embodiment]

In the second modification of the third embodiment, the FPGA management unit 104 may receive a usage request including an execution function and corresponding argument set in place of the FPGA activation argument 1513. In this case, it is necessary to transfer program data for the execution function between the application 101 and the FPGA management unit 104 using shared memory, memory managed by the kernel or the like, but in this way, benefits associated with flexible FPGA control for each application 101 may be obtained in addition to predetermined control by the FPGA management unit 104. Note that the execution function and corresponding argument set is an example of a setting value included in the usage request.

[Third Modification of the Third Embodiment]

In the third modification of the third embodiment, the usage request 1510 may include division information. The division information is information for dividing the processing operations using the FPGA 12. The division information includes, for example, the number of repetitions of a processing operation and divided input data. Based on this division information, the FPGA management unit 104 may confirm the FPGA usage waiting queue each time it executes a portion of a processing operation corresponding to the usage request 1510, and when there is another request (usage request 1510), the FPGA management unit 104 may execute another portion of a processing operation corresponding to the usage request 1510 subsequent to executing the processing of the current request. In this way, performing processing in an interleave fashion may be possible. Thus, until now, when there was an application that used the FPGA 12 for a long period of time, another application (herein, application #B) could not use the FPGA 12 until the application that used the FPGA 12 for a long time (herein, application #A) reached completion. However, by temporarily suspending use of the FPGA 12 by application #A during processing, and resuming processing of the usage request 1510 for application #A after application #B uses the FPGA 12, it becomes possible to efficiently utilize the FPGA 12.

Fourth Embodiment

Herein, a fourth embodiment will be described. The description herein will focus on the differences from the third embodiment, and description of the similarities with the third embodiment will be omitted or simplified.

Finally, an example in which the FPGA has two configuration data areas, and a configuration control unit switches the processing using a time division technique will be described.

Figure 18:
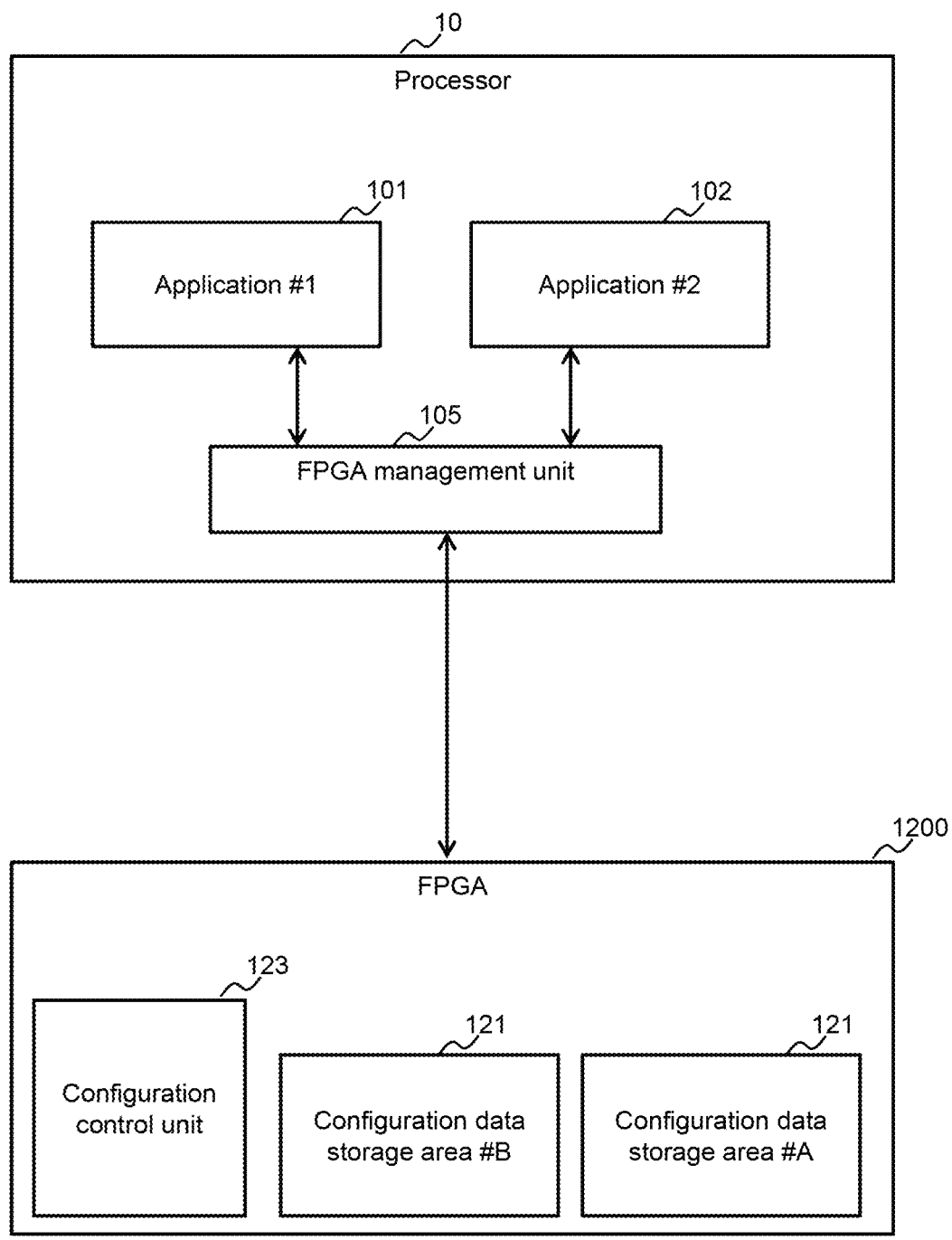
FIG. 18 illustrates a conceptual diagram of a fourth embodiment.

FIG. 18 illustrates a conceptual diagram of a fourth embodiment.

The FPGA 1200 includes two configuration data storage areas #A and #B as well as a configuration control unit 123 that controls which one of these is used. For convenience of explanation, although two configuration data areas 121 exist, three or more configuration data areas 121 may be exist.

First, the FPGA management unit 105 manages the usage status of the configuration data storage areas #A and #B in the FPGA 1200. On receiving a usage request 1510 from the application #1, the FPGA management unit 105 loads FPGA configuration data #1 for application #1 in an unused configuration data storage area A. Similarly, on receiving a usage request 1510 from the application #2, the FPGA management unit 105 loads the FPGA configuration data #2 of the application #2 in an unused configuration data storage area #B. Subsequently, the FPGA management unit 105 instructs the configuration control unit 123 to switch at a certain fixed time (that is, periodically). On receiving the switching instruction, the configuration control unit 123 stops the read control for input data from the FPGA memory 103. After confirming that the processing of the kernel unit of the FPGA 1200 has been completed (in particular, that there are no requests to external devices of the FPGA 1200), the configuration control unit 123 stores the value of the flip flop within the FPGA 1200 or the FPGA memory 103, changes the target FPGA configuration data from configuration data storage area #A to #B, and performs other kernel processing. In this way, time division processing may be facilitated, and it may be possible to use resources equally at regular time intervals. Note that, as the interface between the application 101 and the FPGA management unit 105 may be the same interface as in the third embodiment (FIG. 15), the description of it is omitted from the present embodiment.

With respect to the present embodiment, although an example has been described in which the configuration data area 121 is included in the FPGA 1200, it is not necessary for the configuration data area 121 to be within the FPGA 1200. For example, the configuration data area 121 may be located in the FPGA memory 103, such that the configuration control unit 123 may read the FPGA configuration data from the FPGA memory 103 that is, the FPGA configuration data may be stored anywhere provided that the configuration control unit 123 may load the FPGA configuration data from itself. Also, although an example of performing switching based on instructions from the FPGA management unit 105 has been described herein, a configuration in which an area such as a register for setting the switching time (time period) for the configuration control unit 123 is in the FPGA 1200, and the configuration data area may be switched automatically (by the configuration control unit 123) at the switching time set to the area by the FPGA management unit 105 is also possible.

In the present embodiment, it is possible to switch the configuration data storage area. That is, time division processing may become possible. Accordingly, even if there are applications that utilize the FPGA for a long period of time, FPGA resources can be used equally.

When implementing the present embodiment, at initialization time, it may be necessary for the FPGA management unit 105 to query the FPGA 1200 for device information regarding the possibility of handling multiple configurations, and to perform control operations based on the answer to the query.

Although several embodiments and modifications have been described above, the present invention is not limited to these embodiments and modifications, and it should be understood that various modifications can be made without departing from the spirit of the invention.

For example, with respect to the first to fourth embodiments, one FPGA is used when switching functions, but configurations of the present invention in which the FPGA is logically divided using partial reconfigurations techniques are also possible. In this case as well, similar to the example in which a plurality of FPGAs are connected, the FPGA management unit may manage the FPGA device information and FPGA usage status for each logical division in the FPGA.

Further, for example, with respect to the first to fourth embodiments, applications may issue the usage request directly, but configurations of the present invention in which applications are operating on virtual machines (VMs) and the usage request is issued from the VM are also possible.

Also, for example, the computing apparatus and the cloud are not limited to the configurations of FIG. 1 and FIG. 10. For instance, although the processor and the FPGA are described as independent structures, configurations in which a processor is included in the FPGA and a proprietary bus is connected to the logic portion of the FPGA, as well as configurations in which the FPGA is mounted within the processor, and the FPGA is structured by an internal bus are also possible.

Further, for example, with respect to the first to fourth embodiments, a plurality of applications are started at the same time in order to simplify explanation, but it is naturally possible for the activation times of each application to differ as well.

In addition, for example, with respect to the first to fourth embodiments, although examples related to exchanging various types of information such as FPGA management information, usage requests, usage request responses and the like have been described herein, it is not necessary for each type of information to be separate, and combinations of multiple types of information are also possible. Also, in the present description, the exchanges between applications and the FPGA management unit are described in detail, but the exchanges are not limited thereto, and a plurality of functions may be performed by a single inquiry, or may be divided among a plurality of inquiries. Configurations in which other implementation details differ are also possible.

Also, for example, in the first embodiment, the FPGA 12 need not be incorporated within the computing apparatus 1, and it may be connected to the computing apparatus 1 via a communication network. Further, one FPGA 12 may be shared by a plurality of computing apparatuses 1. That is, as one example of each of a plurality of processing modules sharing one or more FPGAs 12, any one of an application, a thread, a VM, or a computing apparatus may be utilized.

Further, the present invention may be provided with respect to PLDs other than FPGA, such as, for instance, to Complex Programmable Logic Devices (CPLDs).

In addition, the I/F 20 described above is an example of an interface unit. The interface unit is one or more interfaces. The interface and the FPGA 12 may be connected with 1:1, many:1, 1:many, or many:many interfaces. The FPGA 12 is an example of a PLD.

In addition, the processor 10 described above is an example of a processor unit. The processor unit is one or more processors. The processor and the interface may be connected with 1:1, many:1, 1:many, or many:many interfaces.

Further, for example, a system including a processor, and an I/F, and an FPGA management unit can be referred to as an FPGA management system. As such, for example, in the first embodiment, the computing apparatus 1 includes an FPGA management system. Also, for example, in the second embodiment, the cloud 2 includes an FPGA management system. The FPGA management system may or may not include an FPGA. An FPGA is one example of a PLD. Accordingly, the FPGA management system is an example of a PLD management system. More particularly, for example, the FPGA management unit is an example of a PLD management unit, the I/F is an example of an interface unit, and the processor is an example of a processor unit. Therefore, the PLD management system includes an interface unit connected to one or more PLDs, a processor unit connected to the interface unit, and a PLD management unit executed by the processor unit.

Further, as exemplified in FIG. 5 and FIG. 15, the FPGA usage request includes one or more types of information elements such as an FPGA model number 511. The FPGA usage request is an example of the usage request of a PLD. The content of the usage request of the PLD is correspond to at least one of one or more information elements included in the usage request such as, for example, the model number of the PLD and the storage location (address) of the configuration data of the PLD.

Also, with respect to the first to fourth embodiments, each of the FPGA usage request and the usage request response includes one or more types of information, respectively. Including information, however, is but one example of associating information. For instance, for at least one or more type of information, the FPGA usage request or usage request response may include a pointer to particular information instead of the information itself.

As described herein, two or more of the above-described embodiments and modifications can be combined as suitable. For example, the first modification of the second embodiment (in which, in addition to the FPGA model number 511, the usage request 510 includes a desired FPGA number, which indicates the number of FPGAs 12 that the request source application wishes to use) may be applied to any of the other described embodiments and modifications. Also, for example, part of the fourth modification of the second embodiment (in which the FPGA management unit 103 processes the usage requests 510 in the usage waiting queue in descending order based on the priority of the usage request 510, and thread (or application) transmits usage requests 510 including the priority level to the FPGA management unit 103) may also be applied to any of the described embodiments and modifications.

REFERENCE SIGNS LIST

1 Computing Apparatus
10 Processor
11 Memory
12 FPGA
13 FPGA Memory
14 Storage Device
20 I/F
121 Configuration Data Storage Area

The invention claimed is:

1. A Programmable Logic Device (PLD) management system comprising:
  one or more PLDs;
  an interface unit connected to the one or more PLDs;
  a processor connected to the interface unit; and
  a computer program executed by the processor, configured to manage a usage status for each of the one or more PLDs;
  wherein the computer program is configured to:
    receive, from a request source module which is any one of a plurality of processing modules sharing access to each of the one or more PLDs, a usage request for a PLD, and
    perform control to prevent, on receiving the usage request, based on a current usage status of a corresponding PLD that is the PLD corresponding to the usage request and content of the usage request, two or more of the plurality of processing modules from utilizing the same PLD at the same time, wherein the plurality of processing modules are any one of an application, a thread, or a virtual machine.

2. The PLD management system according to claim 1, wherein the control includes:
  returning, to the request source module, with respect to the received usage request, a usage request response associated with usability information that is information indicating whether or not the corresponding PLD is usable and target device information that is information for managing access to the corresponding PLD.

3. The PLD management system according to claim 2, wherein:
  the computer program is configured:
    when the corresponding PLD is usable, to include information for accessing to the corresponding PLD in the target device information, and
    when the corresponding PLD is unusable, not to include information for accessing to the corresponding PLD in the target device information.

4. The PLD management system according to claim 2, wherein:
  a storage location for configuration data of the corresponding PLD is associated with the received usage request; and
  the computer program is configured to return, when the corresponding PLD is usable, the usage request response to the request resource module after loading the configuration data from the storage location into the corresponding PLD.

5. The PLD management system according to claim 2, wherein:
  the computer program is configured to
  manage the received usage request as an usage request in a waiting state when the corresponding PLD is unusable; and
  cancel, when a cancellation request is received from the request source module that received the usage request response associated with the usability information indicating that the corresponding PLD is unusable, the usage request in the waiting state corresponding to the received cancellation request.

6. The PLD management system according to claim 5, wherein:
  the computer program is configured to associate, when the corresponding PLD is unusable, with the usage request response, either a predicted completion time of the received usage request or a number of usage requests in a waiting state.

7. The PLD management system according to claim 2, wherein:
  a desired PLD number that is a number of PLDs requested for simultaneous use by the request source module is associated with the received usage request; and
  the computer program is configured to associate, with the usage request response, the target device information corresponding to each of the corresponding PLDs of a number of PLDs determined based on an unused PLD number that is a number of usable corresponding PLDs and the desired PLD number.

8. The PLD management system according to claim 7, wherein:
  the determined number of PLDs is based on a frequency at which the computer program receives the usage requests.

9. The PLD management system according to claim 7, wherein:
  the computer program is configured to process usage requests in a waiting state in descending order of priority;
  the received usage request is associated with a usage request priority level; and
  the determined number of PLDs is based on the usage request priority level associated with the received usage request.

10. The PLD management system according to claim 1, wherein:
  a desired PLD number that is a number of PLDs requested for simultaneous use by the request source module is associated with the received usage request.

11. The PLD management system according to claim 1, wherein:

the computer program is configured to process usage requests in a waiting state in descending order of priority; and the received usage request is associated with a usage request priority level.

12. The PLD management system according to claim 1, wherein:

both a storage location for configuration data of the corresponding PLD and a setting value necessary to execute the corresponding PLD are associated with the received usage request; and the computer program is configured to:

execute, after loading the configuration data from the storage location to the usable corresponding PLD, the corresponding PLD using the setting value, and return, to the request source module, result data processed using the corresponding PLD.

13. The PLD management system according to claim 12, wherein:

the computer program is configured to:

manage a usage frequency for each set of configuration data that is loaded; and load, when there is a usable PLD, configuration data corresponding to a highest usage frequency into the usable PLD.

14. The PLD management system according to claim 12, wherein:

the setting value includes either an argument relating to activation of the corresponding PLD, or an execution function and corresponding argument.

15. The PLD management system according to claim 12, wherein:

division information that is information for dividing processing using the corresponding PLD is associated with the received usage request; and wherein the computer program is configured to:

manage the received usage request in a waiting state when the corresponding PLD is unusable, suspend, when a usage request in the waiting state occurs while a processing operation using the corresponding PLD is performed, the processing operation based on the division information, and execute a processing operation using a PLD corresponding to the usage request in the waiting state.

16. The PLD management system according to claim 1, wherein:

the corresponding PLD includes:

a plurality of configuration data storage areas, and a configuration control unit that is configured to control switching of a configuration data storage area to be used from among the plurality of configuration data storage areas; and wherein the configuration control unit is configured to switch the configuration data storage area to be used based on predetermined time interval.

17. A Programmable Logic Device (PLD) management method comprising:

receiving, from a request source module which is any one of a plurality of processing modules sharing access to each of one or more PLDs, a usage request; and performing control to prevent, when the usage request is received, based on a current usage status of a corresponding PLD that is the PLD corresponding to the usage request and content of the usage request, two or more processing modules of the plurality of processing modules from utilizing the same PLD at the same time, wherein the plurality of processing modules are any one of an application, a thread, or a virtual machine.

18. The PLD management method according to claim 17, wherein the control includes:

returning, to the request source module, with respect to the received usage request, a usage request response associated with usability information that is information indicating whether or not the corresponding PLD is usable and target device information that is information for managing access to the corresponding PLD.

19. The PLD management method according to claim 17, further comprising:

executing, after loading configuration data from storage location of the configuration data of the corresponding PLD to a usable corresponding PLD, the corresponding PLD using a setting value necessary to execute the corresponding PLD; and returning, to the request source module, result data processed using the corresponding PLD.

20. The PLD management method according to claim 17, further comprising:

switching, based on a predetermined time interval, a configuration data storage area to be used from among a plurality of configuration data storage areas.

* * * * *